US012810379B2

(12) United States Patent
Takayama

(10) Patent No.: US 12,810,379 B2
(45) Date of Patent: Nov. 24, 2026

(54) SYSTEMS AND METHODS FOR ALIGNING IMAGES

(71) Applicant: Nikon Corporation, Tokyo (JP)

(72) Inventor: Yuuya Takayama, Yokohama (JP)

(73) Assignee: Nikon Corporation, Tokyo (JP)

( * ) Notice: Subject to any disclaimer, the term of this patent is extended or adjusted under 35 U.S.C. 154(b) by 225 days.

(21) Appl. No.: 18/712,245

(22) PCT Filed: Nov. 18, 2022

(86) PCT No.: PCT/US2022/050492
§ 371 (c)(1),
(2) Date: May 21, 2024

(87) PCT Pub. No.: WO2023/091720
PCT Pub. Date: May 25, 2023

(65) Prior Publication Data

US 2025/0014141 A1 Jan. 9, 2025

Related U.S. Application Data

(60) Provisional application No. 63/282,026, filed on Nov. 22, 2021.

(51) Int. Cl.
*G06T 3/14* (2024.01)
*G06T 7/33* (2017.01)

(52) U.S. Cl.
CPC . *G06T 3/14* (2024.01); *G06T 7/33* (2017.01)

(58) Field of Classification Search
CPC ................ G06T 3/14; G06T 7/33; G06T 5/80
See application file for complete search history.

(56) References Cited

U.S. PATENT DOCUMENTS

| | | | | |
|---|---|---|---|---|
| 9,626,585 B2 * | 4/2017 | Zhou | G06T 7/11 | |
| 11,481,683 B1 * | 10/2022 | Singh | G06N 5/04 | |
| 2008/0310680 A1 * | 12/2008 | Azuma | G06T 7/77 | 382/104 |
| 2010/0158353 A1 * | 6/2010 | Kim | G06T 7/97 | 382/154 |
| 2018/0365858 A1 * | 12/2018 | Kim | G06T 7/13 | |
| 2025/0389565 A1 * | 12/2025 | Galvin | G01D 21/02 | |

FOREIGN PATENT DOCUMENTS

CN 113096051 * 7/2021

* cited by examiner

*Primary Examiner* — John B Strege

(57) ABSTRACT

Various factors can degrade the quality of camera images. For example, images can be distorted by rotation, shear, horizontal lens shift, and/or vertical lens shift. Such factors may result in perspective distortion of a subject being captured in a camera image by transforming horizontal and/or vertical lines of the subject and/or subject plane into lines that are at an angle to the horizon and/or the normal to the horizon in the image. Prior techniques that rely on search processes to find a homography for perspective correction in images can be time-consuming and computationally expensive. Moreover, these prior techniques may fail to find a solution that results in a corrected image of sufficient quality. The disclosed techniques overcome these drawbacks by applying fast homography transformations based on deterministic methods to align images that exhibit perspective distortion.

20 Claims, 18 Drawing Sheets

Determining homography from vanishing point data width: $w$, height: $h$
Horizontal vp: $\theta_h, r_h$
Vertical vp: $\theta_v, r_v$ Vanishing points are converted into homography transformation matrices as follows:

Rotation $$\varphi_{rot} = \frac{1}{2}(\theta_v + \theta_h) \Rightarrow \begin{pmatrix} \cos\varphi_{rot} & \sin\varphi_{rot} & (1-\cos\varphi_{rot}) * \frac{w}{2} - \sin\varphi_{rot} \\ -\sin\varphi_{rot} & \cos\varphi_{rot} & \sin\varphi_{rot} * \frac{w}{2} + (1-\cos\varphi_{rot}) * \frac{h}{2} \\ 0 & 0 & 1 \end{pmatrix}$$

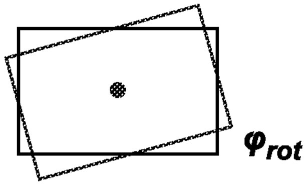

Shear $$\varphi_{sh} = \frac{1}{2}(\theta_v + \theta_h) \Rightarrow \begin{pmatrix} 1 & \tan\varphi_{sh} & 0 \\ \tan\varphi_{sh} & 1 & 0 \\ 0 & 0 & 1 \end{pmatrix}$$

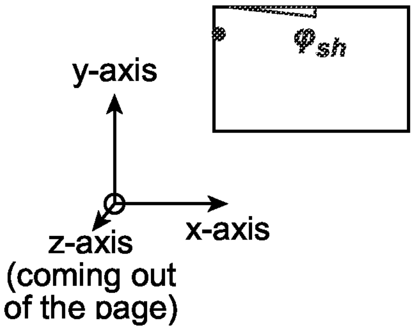

FIG. 13

Determining homography from vanishing point data

Vanishing points are converted into homography transformation matrices as follows:

width: $w$, height: $h$
Horizontal vp: $\theta_h, r_h$
Vertical vp: $\theta_v, r_v$ Horizontal lens shift $$l_h = \begin{cases} \dfrac{r_h * w + 2}{3r_h * w + 2} & (r_h \geq 0) \\ \dfrac{3r_h * w - 2}{r_h * w - 2} & (r_h \leq 0) \end{cases} \Rightarrow \begin{pmatrix} l_h^2 + 4l_h - 1 & 0 & -w(l_h - 1) \\ \frac{h}{w}(l_h^2 - 1) & (l_h + 1)^2 & -\frac{h}{2}(l_h^2 - 1) \\ \frac{2}{w}(l_h^2 - 1) & 0 & 2(l_h + 1) \end{pmatrix}$$

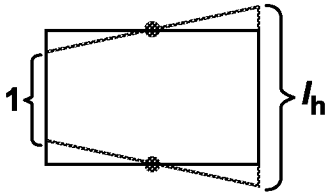

Vertical lens shift $$l_v = \begin{cases} \dfrac{r_v * h + 2}{3r_v * h + 2} & (r_v \geq 0) \\ \dfrac{3r_v * h - 2}{r_v - 2} & (r_v \leq 0) \end{cases} \Rightarrow \begin{pmatrix} (l_v + 1)^2 & \frac{w}{h}(l_v^2 - 1) & -\frac{w}{2}(l_v^2 - 1) \\ 0 & l_v^2 + 4l_v - 1 & -h(l_v - 1) \\ 0 & \frac{2}{h}(l_v^2 - 1) & 2(l_v + 1) \end{pmatrix}$$

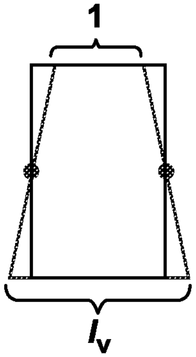

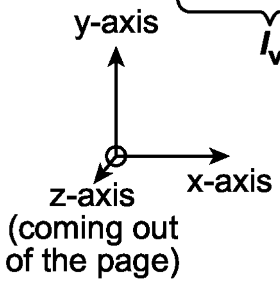

FIG. 14

Homography for shear

Orthogonalize VPs. For (w, h)-image, apply the matrix $$\begin{pmatrix} \frac{w}{w-h\tan\frac{\gamma}{2}} & \frac{-w\tan\frac{\gamma}{2}}{w-h\tan\frac{\gamma}{2}} & 0 \\ \frac{-h\tan\frac{\gamma}{2}}{h-w\tan\frac{\gamma}{2}} & \frac{h}{h-w\tan\frac{\gamma}{2}} & 0 \\ 0 & 0 & 1 \end{pmatrix}$$

Horizontal: $(r_h\cos(\gamma/2), r_h\sin(\gamma/2), 1) \mapsto \left(\frac{r_h w\cos\gamma}{w\cos\frac{\gamma}{2} - h\sin\frac{\gamma}{2}}, 0, 1\right)$

Vertical: $(r_v\sin(\gamma/2), r_v\cos(\gamma/2), 1) \mapsto \left(0, \frac{r_v h\cos\gamma}{h\cos\frac{\gamma}{2} - w\sin\frac{\gamma}{2}}, 1\right)$

Image center: $\left(\pm\frac{w}{2}, \pm\frac{h}{2}, 1\right) \mapsto \left(\pm\frac{w}{2}, \pm\frac{h}{2}, 1\right)$

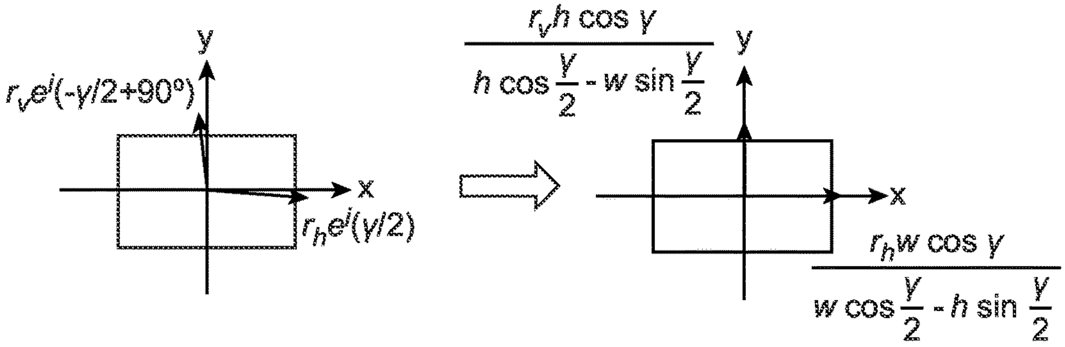

FIG. 19

Homography for horizontal shift

Apply horizontal shift by $$\begin{pmatrix} 1-\frac{w^2}{4(r'_h)^2} & 0 & 0 \\ 0 & 1 & 0 \\ -\frac{1}{r'_h} & 0 & 1 \end{pmatrix}$$

Vertical: $(0, y, 1) \mapsto (0, y, 1)$

Horizontal: $(r'_h, 0, 1) \mapsto (*, 0, 0)$

Width: $\left(\pm\frac{w}{2}, 0, 1\right) \mapsto \left(\pm\left(1-\frac{w^2}{4(r'_h)^2}\right)\frac{w}{2}, 0, 1 \mp \frac{w}{2r'_h}\right) = \left(\pm\frac{w}{2} + \frac{w^2}{4r'_h}, 0, 1\right)$

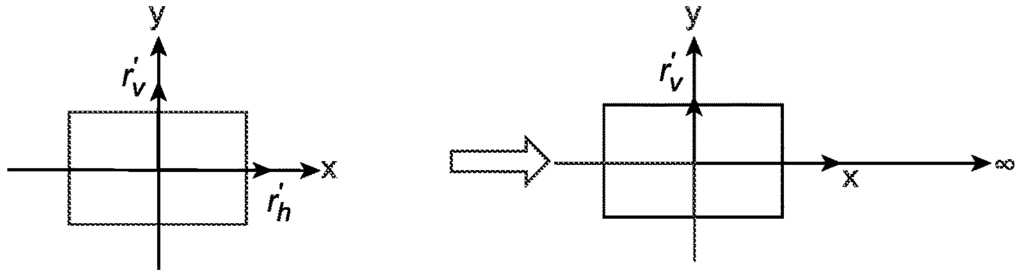

FIG. 20

SYSTEMS AND METHODS FOR ALIGNING IMAGES

CROSS-REFERENCE

The present application claims priority to U.S. Provisional Patent Application No. 63/282,026, filed on Nov. 22, 2021, entitled "SYSTEMS AND METHODS FOR ALIGNING IMAGES," which is herein incorporated by reference in its entirety for all purposes.

BACKGROUND

Various factors can degrade the quality of camera images. For example, images can be distorted by rotation of the lens and/or camera image plane relative to the subject plane about the x-axis, y-axis, and/or a z-axis. Here the horizontal x-axis and vertical y-axis are parallel to the subject plane while the z-axis is perpendicular or orthogonal to it. Rotation of the plane of focus can be done by rotating the lens plane and/or the image plane. Rotating the lens about the z-axis (for example, by adjusting the front standard on a view camera) is commonly called rotation and does not alter linear perspective in a planar subject such as the face of a building since the lens and/or camera image plane remain parallel to the subject plane. Rotating the lens and/or camera image plane such that it is no longer square to the subject plane (for example, about the horizontal x-axis and the vertical y-axis) results in distortion commonly called shear. Rotation of the lens and/or camera image plane about the horizontal x-axis is commonly called tilt, and rotation about a vertical y-axis is commonly called swing (although it can also be referred to as tilt about the y-axis). As described herein, rotation of the lens and/or camera image plane about the horizontal x-axis is referred to as a horizontal lens shift and/or horizontal shift, while rotation of the lens and/or camera image plane about a vertical y-axis referred to as a vertical lens shift and/or vertical shift.

Factors such as rotation, shear, horizontal lens shift, and/or vertical lens shift may result in perspective distortion of a subject being captured in a camera image by transforming horizontal and/or vertical lines of the subject and/or subject plane into lines that are at an angle to the horizon and/or the normal to the horizon in the image. Prior techniques used by existing systems attempt to address or correct perspective distortion by applying a homography or homographic transformation to the image. These prior techniques generally rely on an iterative approach using search methods to determine a homography that when applied to the image, produces a result of sufficient quality. However, such an iterative approach is often computationally expensive and/or takes a substantial amount of time to converge to an acceptable solution. Moreover, the iterative approach used in prior systems does not guarantee convergence to a homography resulting in a corrected image of sufficient quality. Accordingly, it would be advantageous to provide systems and methods for aligning images and/or compensating for distortions in images that do not suffer from the drawbacks of prior techniques.

BRIEF DESCRIPTION OF THE DRAWINGS

Various embodiments of the invention are disclosed in the following detailed description and the accompanying drawings.

FIG. 13 depicts how vanishing points are converted into homography transformation matrices for rotation and shear.

FIG. 14 depicts how vanishing points are converted into homography transformation matrices for horizontal and vertical lens shift.

FIG. 19 shows a process to determine a homography to correct for shear.

FIG. 20 shows a process to determine a homography to correct for horizontal shift and/or tilt.

DETAILED DESCRIPTION

Figure 1A:
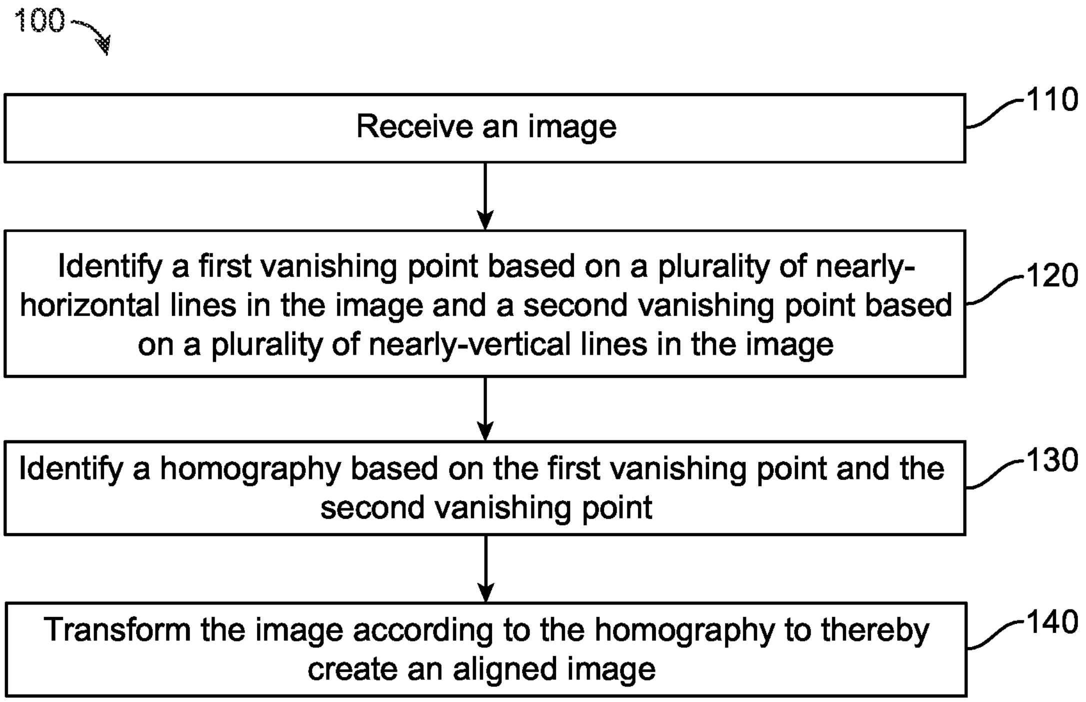
FIG. 1A shows a flowchart of an exemplary method for aligning an image.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Camera images can be impacted by a number of factors that degrade image quality. For instance, images can be distorted by rotation of the lens and/or camera image plane relative to the subject plane, resulting in distortion commonly called rotation, shear and/or tilt. Tilt can be in a horizontal direction about the x-axis (herein referred to as horizontal lens shift and/or horizontal shift) and/or in a vertical direction about the y-axis (herein referred to as vertical lens shift and/or vertical shift). Tilt about the vertical and/or y-axis is sometimes called swing. The distortion is manifested in the image when horizontal and/or vertical lines in the subject plane are transformed into lines that are at a substantial angle to the horizon and/or the normal to the horizon in the image. Perspective distortion in images has been addressed by prior techniques that apply a homography and/or homographic transformation to a distorted image in order to produce transformed images that do not suffer from these distortions. Prior techniques generally rely on search methods to find a homography to apply to the image to correct the distortion and initialize the homography by selecting arbitrary initial values or parameters. The initial homography is applied to the image and the quality of the resulting transformed image is determined. The initial homography is then perturbed (for instance, using a simplex method) to form an updated homography. The updated homography is applied to the image and the quality of the resulting transformed image is again determined. This perturbative updating method is then iterated until the resulting transformed image attains a sufficient quality.

The prior techniques as described above suffer from a number of drawbacks. First, the iterative process may never converge on a homography that generates an image of sufficient quality. Second, even when the iterative process does converge on a homography with acceptable results, the process may take a significant amount of time to do so. As such, prior techniques that rely on an iterative search method approach can be slow and/or require inordinate computing resources, which can render them unusable in certain applications.

Accordingly, provided herein are techniques for aligning images that overcome at least some of the drawbacks of prior techniques by applying fast homography and/or homographic transformations based on non-iterative computational methods. Because the computation is done deterministically in the techniques disclosed herein, it is both fast and stable as compared with prior systems and methods that rely on iterative search processes.

The disclosed techniques receive an image and generally identify nearly-horizontal and nearly-vertical lines in the image. From the nearly-horizontal lines, a first vanishing point is determined. From the nearly-vertical lines, a second vanishing point is determined. The first and second vanishing points are used to determine a homography, which is then applied to the image to generate an aligned image. The homography transforms nearly-horizontal lines in the original image to substantially horizontal lines in the aligned image and transforms nearly-vertical lines in the original image to substantially vertical lines in the aligned image. The first and second vanishing points are determined by finding first and second intersection points based on the nearly-horizontal lines and the nearly-vertical lines after the nearly-horizontal lines and the nearly-vertical lines have been transformed into modified polar coordinates. When the first and second vanishing points cannot be determined uniquely, a voting operation is applied to determine the first and second vanishing points. When a yaw, pitch, and/or roll of the camera used to obtain the image are available, these parameters may be used to, at least in part, determine the first and/or second vanishing point.

In some embodiments and as disclosed herein, a method for aligning an image comprises: (a) receiving an image; (b) identifying a first vanishing point based on a plurality of nearly-horizontal lines in the image and a second vanishing point based on a plurality of nearly-vertical lines in the image, each nearly-horizontal line deviating from perfectly horizontal by at most a first angle and each nearly-vertical line deviating from perfectly vertical by at most a second angle; (c) identifying a homography based on the first vanishing point and the second vanishing point; and (d) transforming the image according to the homography to create an aligned image. Here, the plurality of nearly-horizontal lines is transformed to a plurality of substantially horizontal lines, each substantially horizontal line deviating from perfectly horizontal by at most a third angle. Additionally, the plurality of nearly-vertical lines is transformed to a plurality of substantially vertical lines, each substantially vertical line deviating from perfectly vertical by at most a fourth angle.

FIG. 1A shows a flowchart depicting an exemplary method 100 for aligning an image. Method 100 includes receiving an image at 110. At 120, a first vanishing point is identified based on a plurality of nearly-horizontal lines in the image and a second vanishing point is identified based on a plurality of nearly-vertical lines in the image. In some embodiments and as described below in examples with respect to FIGS. 11B-11C, each nearly-horizontal line deviates from perfectly horizontal by at most a first angle and each nearly-vertical line deviates from perfectly vertical by at most a second angle.

In some embodiments, the first and/or second angle is at least about 1 degree, 2 degrees, 3 degrees, 4 degrees, 5 degrees, 6 degrees, 7 degrees, 8 degrees, 9 degrees, 10 degrees, 15 degrees, 20 degrees, 25 degrees, 30 degrees, or more.

In some embodiments, the first and/or second angle is at most about 30 degrees, 25 degrees, 20 degrees, 15 degrees, 10 degrees, 9 degrees, 8 degrees, 7 degrees, 6 degrees, 5 degrees, 4 degrees, 3 degrees, 2 degrees, 1 degree, or less. In some embodiments, the first and/or second angle is within a range defined by any two of the preceding values. An example of an embodiment wherein the first angle and/or the second angle is at most 15 degrees is described herein with respect to FIGS. 11B and 11C respectively.

At 130, a homography is identified based on the first vanishing point and the second vanishing point. At 140, the image is transformed according to the homography to create an aligned image. In some embodiments, the plurality of nearly-horizontal lines is transformed to a plurality of substantially horizontal lines, each substantially horizontal line deviating from perfectly horizontal by at most a third angle. Additionally, in some embodiments, the plurality of nearly-vertical lines is transformed to a plurality of substantially vertical lines, each substantially vertical line deviating from perfectly vertical by at most a fourth angle.

In some embodiments, the third and/or fourth angle is at least about 0.001 degrees, 0.002 degrees, 0.003 degrees, 0.004 degrees, 0.005 degrees, 0.006 degrees, 0.007 degrees, 0.008 degrees, 0.009 degrees, 0.01 degrees, 0.02 degrees, 0.03 degrees, 0.04 degrees, 0.05 degrees, 0.06 degrees, 0.07 degrees, 0.08 degrees, 0.09 degrees, 0.1 degrees, 0.2 degrees, 0.3 degrees, 0.4 degrees, 0.5 degrees, 0.6 degrees, 0.7 degrees, 0.8 degrees, 0.9 degrees, 1 degrees, 2 degrees, 3 degrees, 4 degrees, 5 degrees, 6 degrees, 7 degrees, 8 degrees, 9 degrees, 10 degrees, or more.

In some embodiments, the third and/or fourth angle is at most about 10 degrees, 9 degrees, 8 degrees, 7 degrees, 6 degrees, 5 degrees, 4 degrees, 3 degrees, 2 degrees, 1 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees, 0.08 degrees, 0.07 degrees, 0.06 degrees, 0.05 degrees, 0.04 degrees, 0.03 degrees, 0.02 degrees, 0.01 degrees, 0.009 degrees, 0.008 degrees, 0.007 degrees, 0.006 degrees, 0.005 degrees, 0.004 degrees, 0.003 degrees, 0.002 degrees, 0.001 degrees, or less. In some embodiments, the third and/or fourth angle is within a range defined by any two of the preceding values.

In some embodiments, method 100 further comprises identifying the plurality of nearly-horizontal lines in the image and the plurality of nearly-vertical lines in the image. In some embodiments, method 100 further comprises applying a line extraction procedure to identify the plurality of nearly-horizontal lines and the plurality of nearly-vertical lines.

In some embodiments, the line extraction procedure comprises one or more members selected from the group consisting of: a Hough transform, a progressive Hough transform, a line segment detector (LSD) procedure, a real-time LSD procedure, a fast line detector (FLD) procedure, a Cannylines procedure, a dynamic programming procedure, and a PPGNet procedure. Notably, the disclosed techniques are not limited by any particular line extraction procedure. Any line extraction procedure may be employed to identify the plurality of nearly-horizontal lines and the plurality of nearly-vertical lines without limiting the scope of the systems and methods described herein.

Figure 1B:
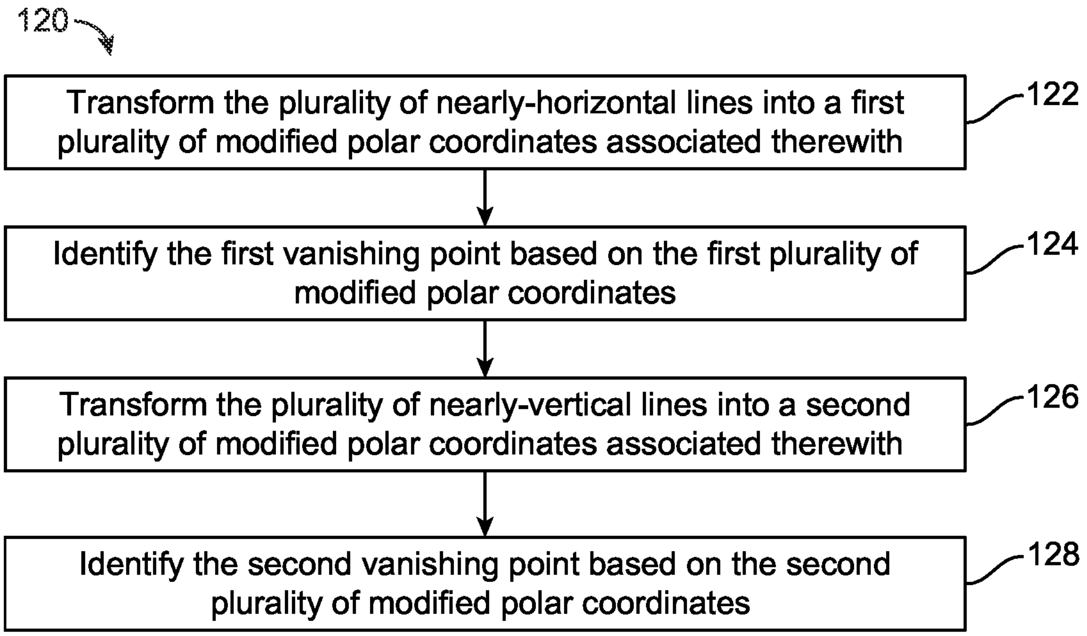
FIG. 1B shows a flowchart for a process of the method of FIG. 1A.

FIG. 1B shows a flowchart depicting additional details for the process 120 of FIG. 1A for identifying a first and second vanishing point as described herein.

In some embodiments, and as shown in FIG. 1B, the step at 120 of identifying a first vanishing point based on a plurality of nearly-horizontal lines in the image and a second vanishing point based on a plurality of nearly-vertical lines in the image includes: transforming the plurality of nearly-horizontal lines into a first plurality of modified polar coordinates associated therewith at 122; identifying the first vanishing point based on the first plurality of modified polar coordinates at 124; transforming the plurality of nearly-vertical lines into a second plurality of modified polar coordinates associated therewith at 126; and identifying the second vanishing point based on the second plurality of modified polar coordinates at 128. An example of applying process 120 to perform a vanishing point analysis using coordinate transformation is described herein with respect to FIGS. 11A-11C.

In some embodiments, the first plurality of modified polar coordinates includes a first plurality of polar angles associated with the plurality of nearly-horizontal lines and a first plurality of inverse radii associated with the plurality of nearly-horizontal lines. In some embodiments, identifying the first vanishing point based on the first plurality of modified polar coordinates at 124 includes identifying a first intersection point based on the first plurality of modified polar coordinates. A depiction of this process is described herein with respect to FIG. 11B. In some embodiments, identifying the first intersection point based on the first plurality of modified polar coordinates is based on a voting operation, as described in the examples below with respect to FIG. 11D.

In some embodiments, the second plurality of modified polar coordinates includes a second plurality of polar angles associated with the plurality of nearly-vertical lines and a second plurality of inverse radii associated with the plurality of nearly-vertical lines. In some embodiments, identifying the second vanishing point based on the second plurality of modified polar coordinates at 128 includes identifying a second intersection point based on the second plurality of modified polar coordinates. A depiction of this process is described herein with respect to FIG. 11C. In some embodiments, identifying a second intersection point based on the second plurality of modified polar coordinates is based on a voting operation, as described in the examples below with respect to FIG. 11D.

In some embodiments, the step at 120 of identifying a first vanishing point based on a plurality of nearly-horizontal lines in the image and a second vanishing point based on a plurality of nearly-vertical lines in the image can be based on a yaw associated with a camera used to obtain the image; a pitch associated with the camera; and/or a roll associated with the camera. An example of an alternative approach using camera posture to identify vanishing points and find a homography is described with respect to FIGS. 15-22.

Figure 1C:
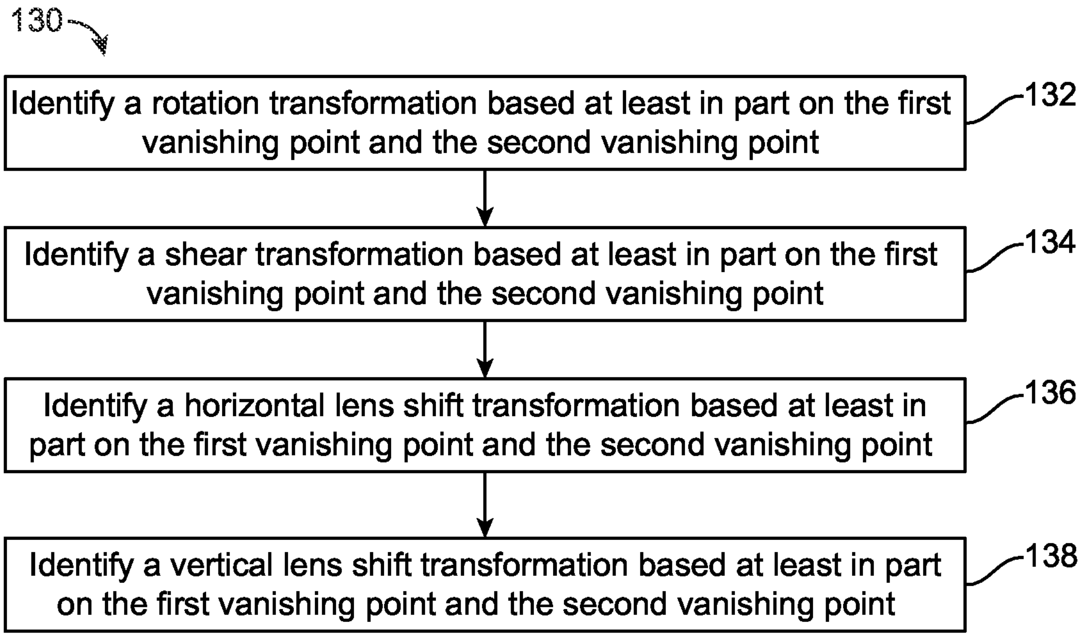
FIG. 1C shows a flowchart for another process of the method of FIG. 1A.

FIG. 1C shows a flowchart depicting additional details for the process 130 of FIG. 1A for identifying a homography based on the first vanishing point and the second vanishing point as described herein.

In some embodiments, and as shown in FIG. 1C, the step at 130 of identifying a homography based on the first vanishing point and the second vanishing point includes at least one or more of the following steps: identifying a rotation transformation (also referred to as a rotation homographic transformation, rotation homography, and/or homography for rotation) based at least in part on the first vanishing point and the second vanishing point at 132; identifying a shear transformation (also referred to as a shear homographic transformation, shear homography, and/or homography for shear) based at least in part on the first vanishing point and the second vanishing point at 134; identifying a horizontal lens shift transformation (also referred to as a horizontal lens shift homographic transformation, horizontal lens shift homography, and/or homography for horizontal lens shift) based at least in part on the first vanishing point and the second vanishing point at 136; and identifying a vertical lens shift transformation (also referred to as a vertical lens shift homographic transformation, vertical lens shift homography, and/or homography for vertical lens shift) based at least in part on the first vanishing point and the second vanishing point at 138. Examples of identifying a homography and/or transformation to compensate for distortion due to rotation, shear, horizontal lens shift, and vertical lens shift are described with respect to FIGS. 12-14 and FIGS. 18-21.

In some embodiments, the homography is determined by taking a product of one or more of the rotation transformation, the shear transformation, the horizontal lens shift transformation, and the vertical lens shift transformation (i.e., by taking a product of one or more of the individual homographies for rotation, shear, horizontal lens shift, and vertical lens shift respectively).

Figure 1D:
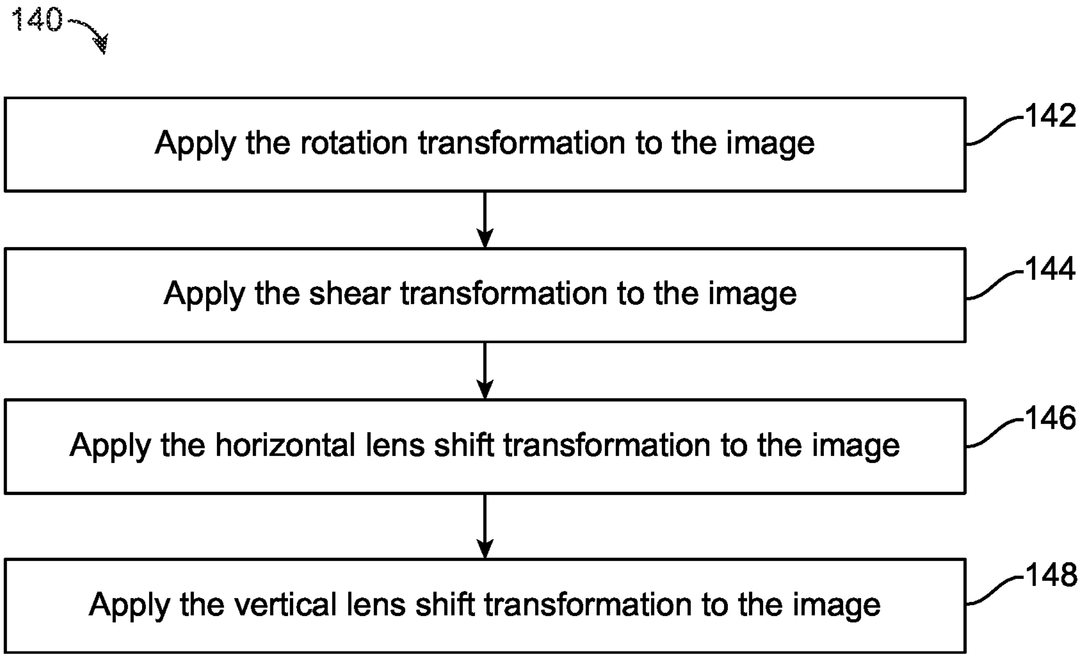
FIG. 1D shows a flowchart for another process of the method of FIG. 1A.

FIG. 1D shows a flowchart depicting additional details for the process 140 of FIG. 1A for transforming the image according to the homography to create an aligned image as described herein. In some embodiments, and as shown in FIG. 1D, the step at 140 of transforming the image according to the homography to create an aligned image includes at least one or more of the following steps: applying the rotation transformation (e.g., as identified in step 132 of FIG. 1C) to the image at 142; applying the shear transformation (e.g., as identified in step 134 of FIG. 1C) to the image at 144; applying the horizontal lens shift transformation (e.g., as identified in step 136 of FIG. 1C) to the image at 146; and applying the vertical lens shift transformation (e.g., as identified in step 138 of FIG. 1C) to the image at 148. Examples of applying a homography and/or transformation to compensate for distortion due to rotation, shear, horizontal lens shift, and vertical lens shift are described herein with respect to FIGS. 6-7, FIGS. 10A-10B, and FIG. 23 respectively.

A system for aligning an image is disclosed that can be used to perform the method 100 of FIG. 1 as described herein. In some embodiments, the system comprises one or more processors and a memory coupled to the one or more processors. In some embodiments, the one or more processors are configured to implement the operations of method 100. In some embodiments, the memory is configured to provide the one or more processors with instructions corresponding to the operations of method 100. In some embodiments, the instructions are embodied in a tangible computer readable storage medium.

Figure 2:
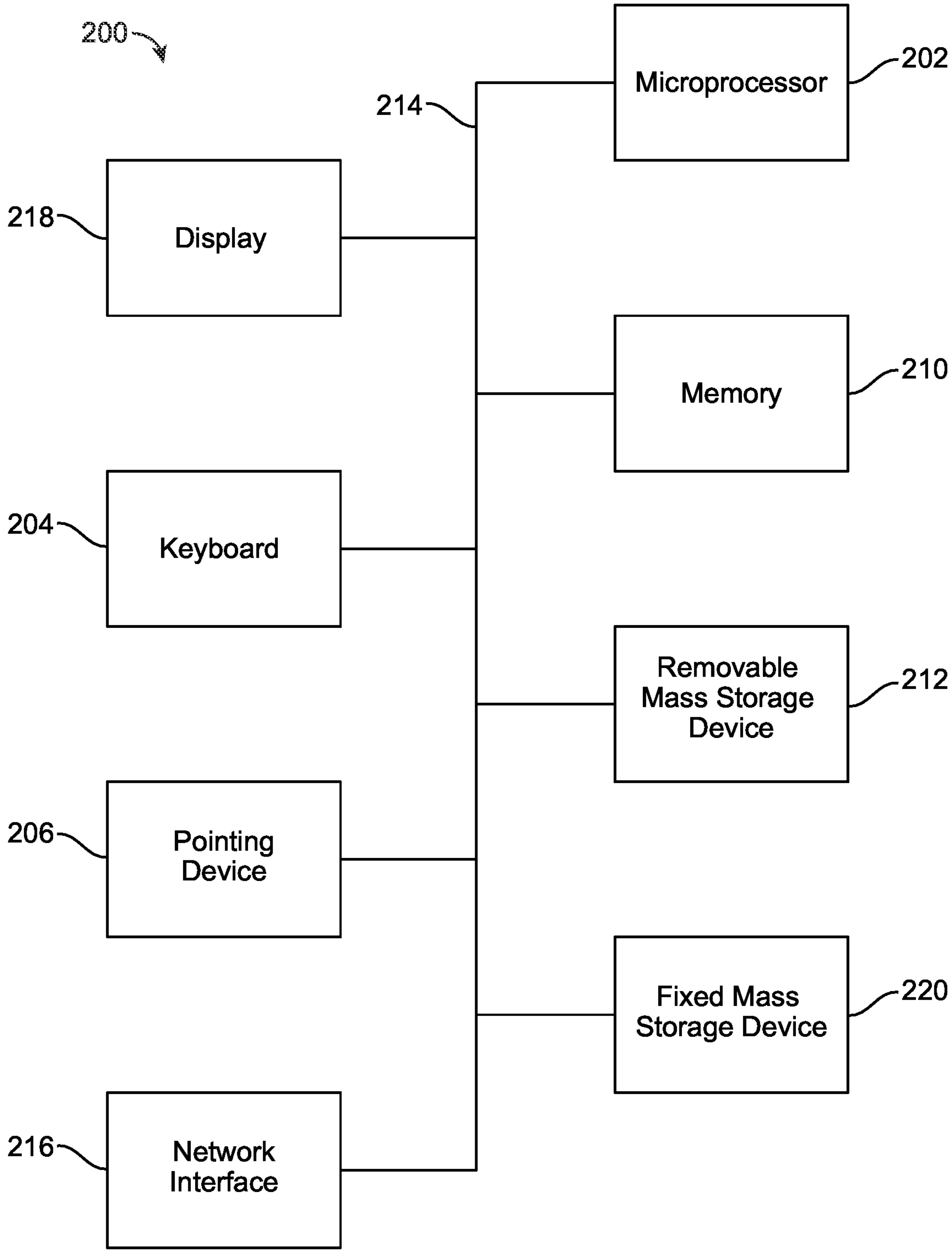
FIG. 2 shows a block diagram of a computer system for aligning an image.

FIG. 2 is a block diagram of a computer system 200 used in some embodiments to perform methods for image alignment described herein (such as method 100 as described herein with respect to FIG. 1A). FIG. 2 illustrates one embodiment of a general purpose computer system. Other computer system architectures and configurations can be used for carrying out the processing of the present invention. Computer system 200, made up of various subsystems described below, includes at least one microprocessor subsystem 202. In some embodiments, the microprocessor subsystem comprises at least one central processing unit (CPU) or graphical processing unit (GPU). The microprocessor subsystem can be implemented by a single-chip processor or by multiple processors. In some embodiments, the microprocessor subsystem is a general purpose digital processor which controls the operation of the computer system 200. Using instructions retrieved from memory 210, the microprocessor subsystem controls the reception and manipulation of input data, and the output and display of data on output devices.

In some embodiments, memory 210 is configured to provide microprocessor subsystem 202 with instructions that when executed cause microprocessor system 202 to implement operations comprising: (a) receiving an image; (b) identifying a first vanishing point based on a plurality of nearly-horizontal lines in the image and a second vanishing point based on a plurality of nearly-vertical lines in the image, each nearly-horizontal line deviating from perfectly horizontal by at most a first angle, each nearly-vertical line deviating from perfectly vertical by at most a second angle; (c) identifying a homography based on the first vanishing point and the second vanishing point; and (d) transforming the image according to the homography to create an aligned image. The plurality of nearly-horizontal lines is transformed to a plurality of substantially horizontal lines, each substantially horizontal line deviating from perfectly horizontal by at most a third angle. Additionally, the plurality of nearly-vertical lines is transformed to a plurality of substantially vertical lines, each substantially vertical line deviating from perfectly vertical by at most a fourth angle.

In some embodiments, the first and/or second angle is at least about 1 degree, 2 degrees, 3 degrees, 4 degrees, 5 degrees, 6 degrees, 7 degrees, 8 degrees, 9 degrees, 10 degrees, 15 degrees, 20 degrees, 25 degrees, 30 degrees, or more.

In some embodiments, the first and/or second angle is at most about 30 degrees, 25 degrees, 20 degrees, 15 degrees, 10 degrees, 9 degrees, 8 degrees, 7 degrees, 6 degrees, 5 degrees, 4 degrees, 3 degrees, 2 degrees, 1 degree, or less. In some embodiments, the first and/or second angle is within a range defined by any two of the preceding values. An example of an embodiment wherein the first angle and/or the second angle is at most 15 degrees is described herein with respect to FIGS. 11B and 11C respectively.

In some embodiments, the third and/or fourth angle is at least about 0.001 degrees, 0.002 degrees, 0.003 degrees, 0.004 degrees, 0.005 degrees, 0.006 degrees, 0.007 degrees, 0.008 degrees, 0.009 degrees, 0.01 degrees, 0.02 degrees, 0.03 degrees, 0.04 degrees, 0.05 degrees, 0.06 degrees, 0.07 degrees, 0.08 degrees, 0.09 degrees, 0.1 degrees, 0.2 degrees, 0.3 degrees, 0.4 degrees, 0.5 degrees, 0.6 degrees, 0.7 degrees, 0.8 degrees, 0.9 degrees, 1 degrees, 2 degrees, 3 degrees, 4 degrees, 5 degrees, 6 degrees, 7 degrees, 8 degrees, 9 degrees, 10 degrees, or more.

In some embodiments, the third and/or fourth angle is at most about 10 degrees, 9 degrees, 8 degrees, 7 degrees, 6 degrees, 5 degrees, 4 degrees, 3 degrees, 2 degrees, 1 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees, 0.08 degrees, 0.07 degrees, 0.06 degrees, 0.05 degrees, 0.04 degrees, 0.03 degrees, 0.02 degrees, 0.01 degrees, 0.009 degrees, 0.008 degrees, 0.007 degrees, 0.006 degrees, 0.005 degrees, 0.004 degrees, 0.003 degrees, 0.002 degrees, 0.001 degrees, or less. In some embodiments, the third and/or fourth angle is within a range defined by any two of the preceding values.

In some embodiments, memory 210 of system 200 is configured to provide microprocessor subsystem 202 with instructions that when executed cause microprocessor subsystem 202 to implement operations that include identifying the plurality of nearly-horizontal lines in the image and the plurality of nearly-vertical lines in the image. In some embodiments, the operations further include applying a line extraction procedure to identify the plurality of nearly-horizontal lines and the plurality of nearly-vertical lines. In some embodiments, the line extraction procedure comprises one or more members selected from the group consisting of: a Hough transform, a progressive Hough transform, a line segment detector (LSD) procedure, a real-time LSD procedure, a fast line detector (FLD) procedure, a Cannylines procedure, a dynamic programming procedure, and a PPG-Net procedure. Notably, the disclosed techniques are not limited by any particular line extraction procedure. Any line extraction procedure may be employed to identify the plurality of nearly-horizontal lines and the plurality of nearly-vertical lines without limiting the scope of the systems and methods described herein.

In some embodiments, the operation of identifying a first vanishing point based on a plurality of nearly-horizontal lines in the image and a second vanishing point based on a plurality of nearly-vertical lines in the image includes: transforming the plurality of nearly-horizontal lines into a first plurality of modified polar coordinates associated therewith; identifying the first vanishing point based on the first plurality of modified polar coordinates; transforming the plurality of nearly-vertical lines into a second plurality of modified polar coordinates associated therewith; and identifying the second vanishing point based on the second plurality of modified polar coordinates. An example of performing a vanishing point analysis based on coordinate transformation to modified polar coordinates is described herein with respect to FIGS. 11A-11C.

In some embodiments, the first plurality of modified polar coordinates includes a first plurality of polar angles associated with the plurality of nearly-horizontal lines and a first plurality of inverse radii associated with the plurality of nearly-horizontal lines. In some embodiments, the operation of identifying the first vanishing point based on the first plurality of modified polar coordinates includes identifying a first intersection point based on the first plurality of modified polar coordinates. This operation is described herein with respect to FIG. 11B. In some embodiments, identifying the first intersection point based on the first plurality of modified polar coordinates is based on a voting operation, as described in the examples below with respect to FIG. 11D.

In some embodiments, the second plurality of modified polar coordinates includes a second plurality of polar angles associated with the plurality of nearly-vertical lines and a second plurality of inverse radii associated with the plurality of nearly-vertical lines. In some embodiments, the operation of identifying the second vanishing point based on the second plurality of modified polar coordinates includes identifying a second intersection point based on the second plurality of modified polar coordinates. This operation is described herein with respect to FIG. 11C. In some embodiments, identifying a second intersection point based on the second plurality of modified polar coordinates is based on a voting operation, as described in the examples below with respect to FIG. 11D.

In some embodiments, the operation of identifying a first vanishing point based on a plurality of nearly-horizontal lines in the image and a second vanishing point based on a plurality of nearly-vertical lines in the image can be based on a yaw associated with a camera used to obtain the image; a pitch associated with the camera; and/or a roll associated with the camera. An example of an approach using camera posture to identify vanishing points and find a homography is described with respect to FIGS. 15-22.

In some embodiments, the operation of identifying a homography based on the first vanishing point and the second vanishing point includes at least one or more of the following: identifying a rotation transformation based at least in part on the first vanishing point and the second vanishing point; identifying a shear transformation based at least in part on the first vanishing point and the second vanishing point; identifying a horizontal lens shift transformation based at least in part on the first vanishing point and the second vanishing point; and identifying a vertical lens shift transformation based at least in part on the first vanishing point and the second vanishing point. Examples of identifying a homography and/or transformation to compensate for distortion due to rotation, shear, horizontal lens shift, and vertical lens shift are described with respect to FIGS. 12-14 and FIGS. 18-21.

In some embodiments, the homography is determined by taking a product of one or more of the rotation transformation, the shear transformation, the horizontal lens shift transformation, and the vertical lens shift transformation (i.e., by taking a product of one or more of the individual homographies for rotation, shear, horizontal lens shift, and vertical lens shift respectively).

In some embodiments, the operation of transforming the image according to the homography to create an aligned image includes at least one or more of the following steps: applying the rotation transformation to the image; applying the shear transformation to the image; applying the horizontal lens shift transformation to the image; and applying the vertical lens shift transformation to the image. Examples of applying a homography and/or transformation to compensate for distortion due to rotation, shear, horizontal lens shift, and vertical lens shift are described herein with respect to FIGS. 6-7, FIGS. 10A-10B, and FIG. 23 respectively.

Returning to FIG. 2, microprocessor subsystem 202 is coupled bi-directionally with memory 210, which can include a first primary storage, typically a random access memory (RAM), and a second primary storage area, typically a read-only memory (ROM). As is known in the art, primary storage can be used as a general storage area and as scratch-pad memory, and can also be used to store input data and processed data. It can also store programming instructions and data, in the form of data objects and text objects, in addition to other data and instructions for processes operating on microprocessor subsystem. Also, as well known in the art, primary storage typically includes basic operating instructions, program code, data and objects used by the microprocessor subsystem to perform its functions. Primary storage devices 210 may include any suitable computer-readable storage media, described below, depending on whether, for example, data access needs to be bi-directional or unidirectional. The microprocessor subsystem 202 can also directly and very rapidly retrieve and store frequently needed data in a cache memory (not shown).

A removable mass storage device 212 provides additional data storage capacity for the computer system 200, and is coupled either bi-directionally (read/write) or unidirectionally (read only) to microprocessor subsystem 202. Storage 212 may also include computer-readable media such as magnetic tape, flash memory, signals embodied on a carrier wave, PC-CARDS, portable mass storage devices, holographic storage devices, and other storage devices. A fixed mass storage 220 can also provide additional data storage capacity. The most common example of mass storage 220 is a hard disk drive. Mass storage 212 and 220 generally store additional programming instructions, data, and the like that typically are not in active use by the processing subsystem. It will be appreciated that the information retained within mass storage 212 and 220 may be incorporated, if needed, in standard fashion as part of primary storage 210 (e.g. RAM) as virtual memory.

In addition to providing processing subsystem 202 access to storage subsystems, bus 214 can be used to provide access other subsystems and devices as well. In the described embodiment, these can include a display monitor 218, a network interface 216, a keyboard 204, and a pointing device 206, as well as an auxiliary input/output device interface, a sound card, speakers, and other subsystems as needed. The pointing device 206 may be a mouse, stylus, track ball, or tablet, and is useful for interacting with a graphical user interface.

The network interface 216 allows the processing subsystem 202 to be coupled to another computer, computer network, or telecommunications network using a network connection as shown. Through the network interface 216, it is contemplated that the processing subsystem 202 might receive information, e.g., data objects or program instructions, from another network, or might output information to another network in the course of performing the above-described method steps. Information, often represented as a sequence of instructions to be executed on a processing subsystem, may be received from and outputted to another network, for example, in the form of a computer data signal embodied in a carrier wave. An interface card or similar device and appropriate software implemented by processing subsystem 202 can be used to connect the computer system 200 to an external network and transfer data according to standard protocols. That is, method embodiments of the present invention may execute solely upon processing subsystem 202, or may be performed across a network such as the Internet, intranet networks, or local area networks, in conjunction with a remote processing subsystem that shares a portion of the processing. Additional mass storage devices (not shown) may also be connected to processing subsystem 202 through network interface 216.

An auxiliary I/O device interface (not shown) can be used in conjunction with computer system 200. The auxiliary I/O device interface can include general and customized interfaces that allow the processing subsystem 202 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts.

Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

In some embodiments, a computer program product for aligning an image is disclosed, the computer program product being embodied in a tangible computer readable storage medium. The computer program product comprises computer instructions for: (a) receiving an image; (b) identifying a first vanishing point based on a plurality of nearly-horizontal lines in the image and a second vanishing point based on a plurality of nearly-vertical lines in the image, each nearly-horizontal line deviating from perfectly horizontal by at most a first angle, each nearly-vertical line deviating from perfectly vertical by at most a second angle; (c) identifying a homography based on the first vanishing point and the second vanishing point; and (d) transforming the image according to the homography to create an aligned image. The plurality of nearly-horizontal lines is transformed to a plurality of substantially horizontal lines, each substantially horizontal line deviating from perfectly horizontal by at most a third angle. Additionally, the plurality of nearly-vertical lines is transformed to a plurality of substantially vertical lines, each substantially vertical line deviating from perfectly vertical by at most a fourth angle.

In some embodiments, the first and/or second angle is at least about 1 degree, 2 degrees, 3 degrees, 4 degrees, 5 degrees, 6 degrees, 7 degrees, 8 degrees, 9 degrees, 10 degrees, 15 degrees, 20 degrees, 25 degrees, 30 degrees, or more.

In some embodiments, the first and/or second angle is at most about 30 degrees, 25 degrees, 20 degrees, 15 degrees, 10 degrees, 9 degrees, 8 degrees, 7 degrees, 6 degrees, 5 degrees, 4 degrees, 3 degrees, 2 degrees, 1 degree, or less. In some embodiments, the first and/or second angle is within a range defined by any two of the preceding values. An example of an embodiment wherein the first angle and/or the second angle is at most 15 degrees is described herein with respect to FIGS. 11B and 11C respectively.

In some embodiments, the third and/or fourth angle is at least about 0.001 degrees, 0.002 degrees, 0.003 degrees, 0.004 degrees, 0.005 degrees, 0.006 degrees, 0.007 degrees, 0.008 degrees, 0.009 degrees, 0.01 degrees, 0.02 degrees, 0.03 degrees, 0.04 degrees, 0.05 degrees, 0.06 degrees, 0.07 degrees, 0.08 degrees, 0.09 degrees, 0.1 degrees, 0.2 degrees, 0.3 degrees, 0.4 degrees, 0.5 degrees, 0.6 degrees, 0.7 degrees, 0.8 degrees, 0.9 degrees, 1 degrees, 2 degrees, 3 degrees, 4 degrees, 5 degrees, 6 degrees, 7 degrees, 8 degrees, 9 degrees, 10 degrees, or more.

In some embodiments, the third and/or fourth angle is at most about 10 degrees, 9 degrees, 8 degrees, 7 degrees, 6 degrees, 5 degrees, 4 degrees, 3 degrees, 2 degrees, 1 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees, 0.08 degrees, 0.07 degrees, 0.06 degrees, 0.05 degrees, 0.04 degrees, 0.03 degrees, 0.02 degrees, 0.01 degrees, 0.009 degrees, 0.008 degrees, 0.007 degrees, 0.006 degrees, 0.005 degrees, 0.004 degrees, 0.003 degrees, 0.002 degrees, 0.001 degrees, or less. In some embodiments, the third and/or fourth angle is within a range defined by any two of the preceding values.

In some embodiments, the computer program product as disclosed herein further includes computer instructions for identifying the plurality of nearly-horizontal lines in the image and the plurality of nearly-vertical lines in the image. In some embodiments, the computer program product includes computer instructions for applying a line extraction procedure to identify the plurality of nearly-horizontal lines and the plurality of nearly-vertical lines.

In some embodiments, the line extraction procedure comprises one or more members selected from the group consisting of: a Hough transform, a progressive Hough transform, a line segment detector (LSD) procedure, a real-time LSD procedure, a fast line detector (FLD) procedure, a Cannylines procedure, a dynamic programming procedure, and a PPGNet procedure. Notably, the disclosed techniques are not limited by any particular line extraction procedure. Any line extraction procedure may be employed to identify the plurality of nearly-horizontal lines and the plurality of nearly-vertical lines without limiting the scope of the systems and methods described herein.

In some embodiments, the computer instructions for identifying a first vanishing point based on a plurality of nearly-horizontal lines in the image and a second vanishing point based on a plurality of nearly-vertical lines in the image further include computer instructions for: transforming the plurality of nearly-horizontal lines into a first plurality of modified polar coordinates associated therewith; identifying the first vanishing point based on the first plurality of modified polar coordinates; transforming the plurality of nearly-vertical lines into a second plurality of modified polar coordinates associated therewith; and identifying the second vanishing point based on the second plurality of modified polar coordinates. An example of performing a vanishing point analysis based on coordinate transformation to modified polar coordinates is described herein with respect to FIGS. 11A-11C.

In some embodiments, the first plurality of modified polar coordinates includes a first plurality of polar angles associated with the plurality of nearly-horizontal lines and a first plurality of inverse radii associated with the plurality of nearly-horizontal lines. In some embodiments, the computer instructions for identifying the first vanishing point based on the first plurality of modified polar coordinates further include computer instructions for identifying a first intersection point based on the first plurality of modified polar coordinates, as described for example with respect to FIG. 11B. In some embodiments, identifying the first intersection point based on the first plurality of modified polar coordinates is based on a voting operation, as described in the examples below with respect to FIG. 11D.

In some embodiments, the second plurality of modified polar coordinates includes a second plurality of polar angles associated with the plurality of nearly-vertical lines and a second plurality of inverse radii associated with the plurality of nearly-vertical lines. In some embodiments, the computer instructions for identifying the second vanishing point based on the second plurality of modified polar coordinates include computer instructions for identifying a second intersection point based on the second plurality of modified polar coordinates, as described for example with respect to FIG. 11C. In some embodiments, identifying a second intersection point based on the second plurality of modified polar coordinates is based on a voting operation, as described in the examples below with respect to FIG. 11D.

In some embodiments, the computer instructions for identifying a first vanishing point based on a plurality of nearly-horizontal lines in the image and a second vanishing point based on a plurality of nearly-vertical lines in the image can be based on a yaw associated with a camera used to obtain the image; a pitch associated with the camera; and/or a roll associated with the camera. An example of an approach using camera posture to identify vanishing points and find a homography is described with respect to FIGS. 15-22.

In some embodiments, the computer instructions for identifying a homography based on the first vanishing point and the second vanishing point include computer instructions for at least one or more of the following: identifying a rotation transformation based at least in part on the first vanishing point and the second vanishing point; identifying a shear transformation based at least in part on the first vanishing point and the second vanishing point; identifying a horizontal lens shift transformation based at least in part on the first vanishing point and the second vanishing point; and identifying a vertical lens shift transformation based at least in part on the first vanishing point and the second vanishing point. Examples of identifying a homography and/or transformation to compensate for distortion due to rotation, shear, horizontal lens shift, and vertical lens shift are described with respect to FIGS. 12-14 and FIGS. 18-21.

In some embodiments, the homography is determined by taking a product of one or more of the rotation transformation, the shear transformation, the horizontal lens shift transformation, and the vertical lens shift transformation (i.e., by taking a product of one or more of the individual homographies for rotation, shear, horizontal lens shift, and vertical lens shift respectively).

In some embodiments, the computer instructions for transforming the image according to the homography to create an aligned image include computer instructions for at least one or more of the following: applying the rotation transformation to the image; applying the shear transformation to the image; applying the horizontal lens shift transformation to the image; and applying the vertical lens shift transformation to the image. Examples of applying a homography and/or transformation to compensate for distortion due to rotation, shear, horizontal lens shift, and vertical lens shift are described herein with respect to FIGS. 6-7, FIGS. 10A-10B, and FIG. 23 respectively.

The computer system shown in FIG. 2 is but an example of a computer system suitable for use with the invention. Other computer systems suitable for use with the invention may include additional or fewer subsystems. In addition, bus 214 is illustrative of any interconnection scheme serving to link the subsystems. Other computer architectures having different configurations of subsystems may also be utilized.

EXAMPLES

Example 1: The Perspective Distortion Problem in an Image

Figure 3:
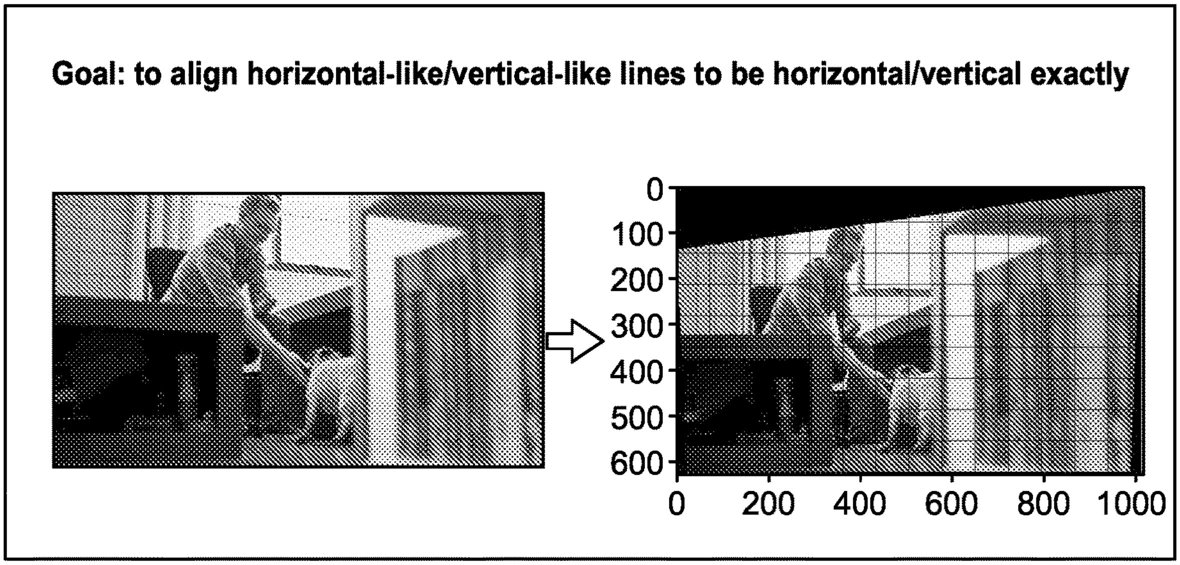
FIG. 3 shows an example of aligning a camera image.
Figure 4:
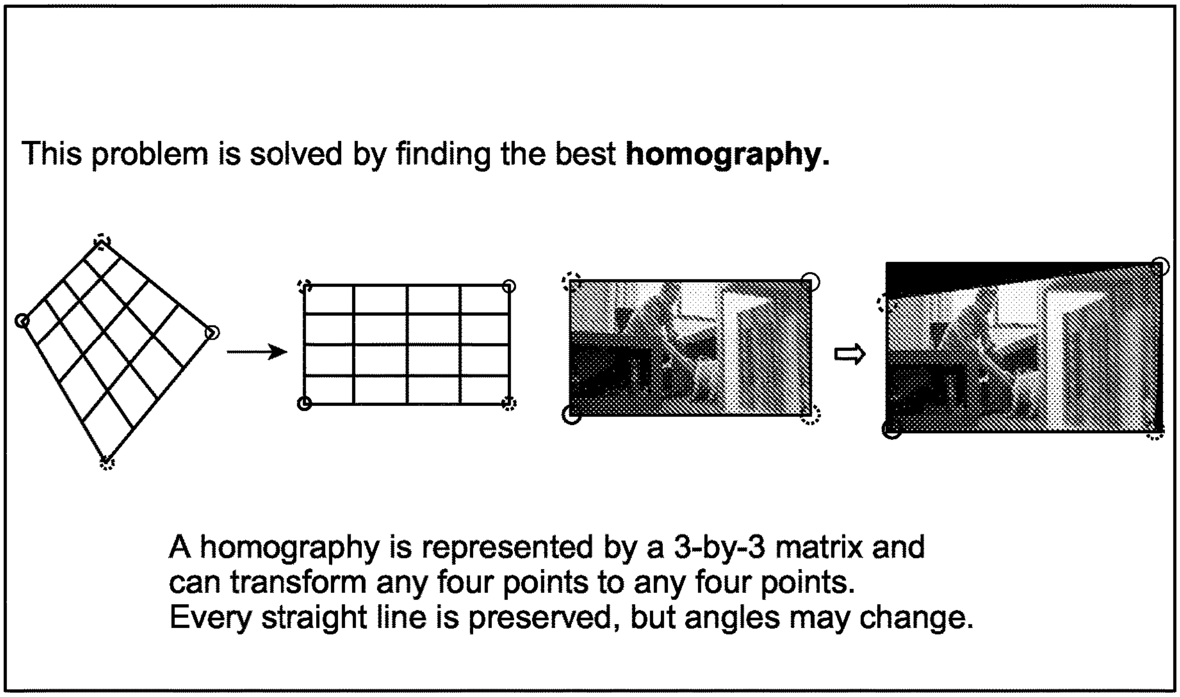
FIG. 4 is a depiction describing a homography.

FIG. 3 illustrates an example of a camera image exhibiting perspective distortion that can be corrected using the techniques as described herein. As shown in FIG. 3, the goal is to transform horizontal and/or vertical lines of the camera image into lines that are at an angle to the horizon and/or the normal to the horizon in the image, thereby correcting the perspective distortion. As shown in FIG. 4, this problem can be solved by finding a homography represented by a 3×3 matrix that can transform any four points on an image to another four points on the transformed image, where every straight line is preserved but angles may change. The goal is to find the best and/or optimal homography that transforms the original image to an image without the distortion or with a significantly reduce degree of distortion.

Figure 5:
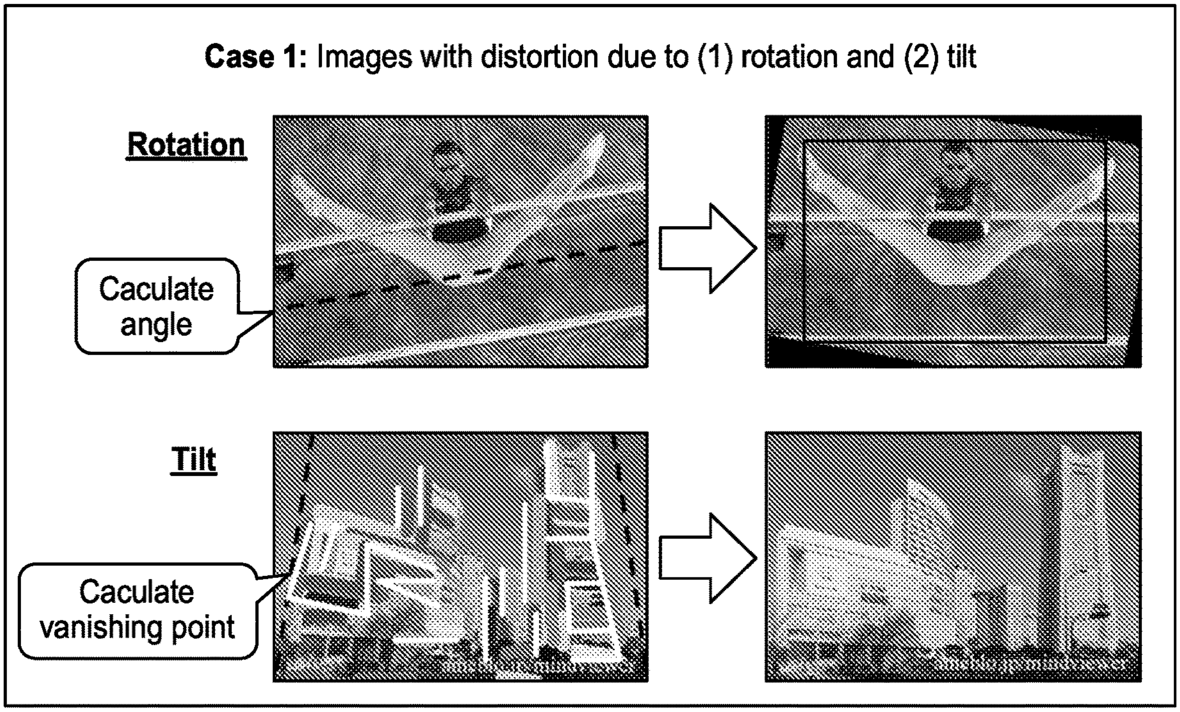
FIG. 5 shows examples of images with distortion due to rotation and tilt.
Figure 6:
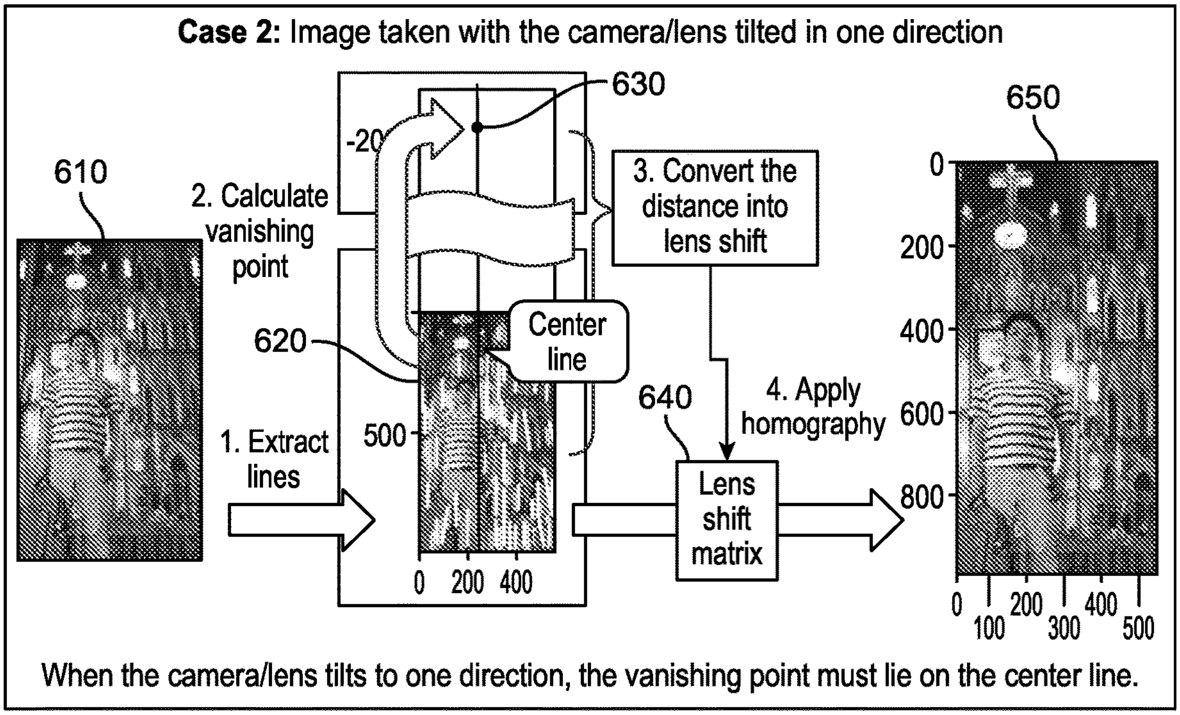
FIG. 6 shows an example of an image taken with tilt in one direction.

FIGS. 5-9 show five cases or examples of various factors that affect or result in perspective distortion in an image. FIG. 5 shows examples of images that are distorted due to rotation and tilt. FIG. 6 shows an example of an image taken with the camera and/or lens tilted in one direction. In this example, the tilt is around the x-axis only such that the vertical lines of the subject are distorted.

As shown in FIG. 6 and applying the techniques herein, an image 610 is received and lines are extracted (e.g., at step 1) to identify nearly-horizontal and nearly-vertical lines in the image, shown at 620. In this case, a line segment detector (LSD) procedure and a fast line detector (FLD) procedure were used for the line extraction, although other alternative methods can be used without limiting the scope of the disclosed techniques. Next, a vanishing point (shown at 630) is determined (e.g., at step 2) from the nearly-vertical lines in the image 620, with the vanishing point 630 lying on the center vertical line as shown in FIG. 6. As described in more detail below and in the figures that follow, the vanishing point data is converted into a homography (e.g., at step 3), which in this case, is a vertical lens shift matrix, shown at 640. The homography transforms nearly-vertical lines in the original image to substantially vertical lines in the aligned image. Finally, the homography (lens shift matrix 640) is applied to the original image 610 (e.g., at step 4), resulting in a corrected and/or aligned image 650 without the distortion in the original image from the tilt.

Figure 7:
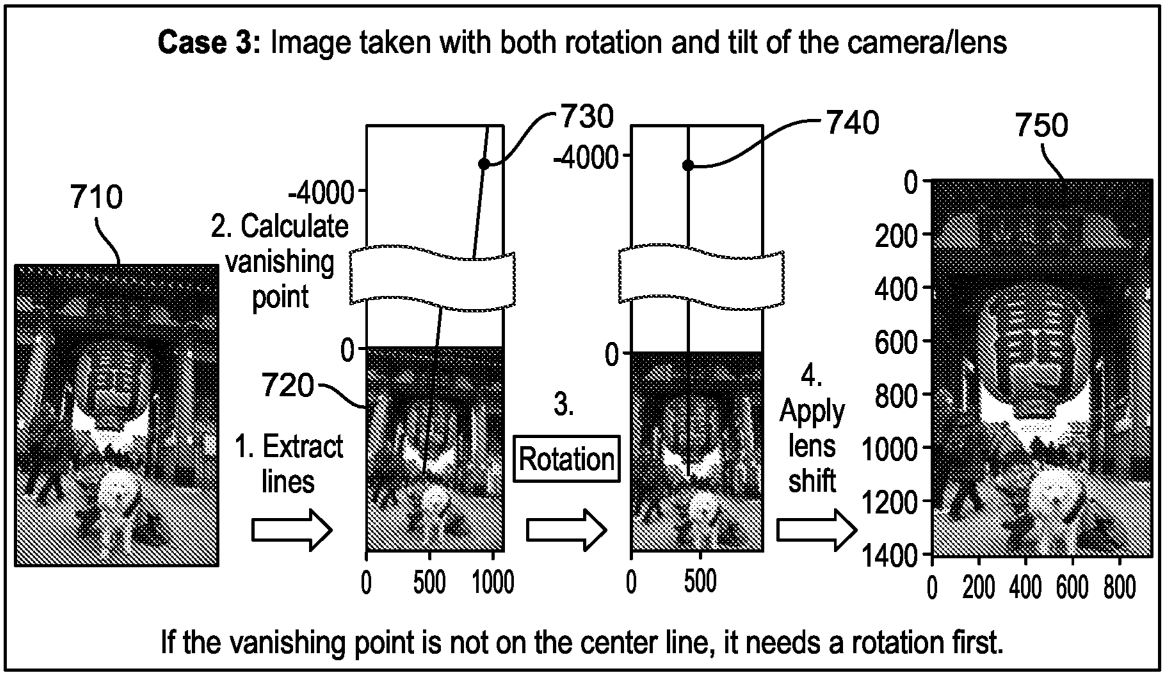
FIG. 7 shows an example of an image taken with both rotation and tilt.

FIG. 7 shows an example of an image 710 taken with the camera and/or lens that has been rotated (around the z-axis) and tilted (around the x-axis) with respect to the subject plane. As shown in FIG. 7, an image 710 is received and lines are extracted (e.g., at step 1) to identify nearly-horizontal and nearly-vertical lines in the image, shown at 720. As in the case of the example of FIG. 6, a line segment detector (LSD) procedure, and a fast line detector (FLD) procedure were used for the line extraction, although other alternative methods can be used without limiting the scope of the disclosed techniques.

Next, a vanishing point 730 is determined (e.g., at step 2) from the nearly-vertical lines in the image 720; however, due to the rotation, the vanishing point 730 does not lie on the center vertical line. Accordingly, the image is rotated first (e.g., at step 3), which puts the vanishing point 740 on the center line as in the example of FIG. 6. The vanishing point data is converted into a homography, which is a vertical lens shift matrix (not shown). The homography transforms nearly-vertical lines in the original image to substantially vertical lines in the aligned image. Finally, the homography (lens shift matrix) is applied to the rotated image (e.g., at step 4), resulting in a corrected and/or aligned image 750 without the distortion in the original image from the rotation and the tilt.

Figure 8:
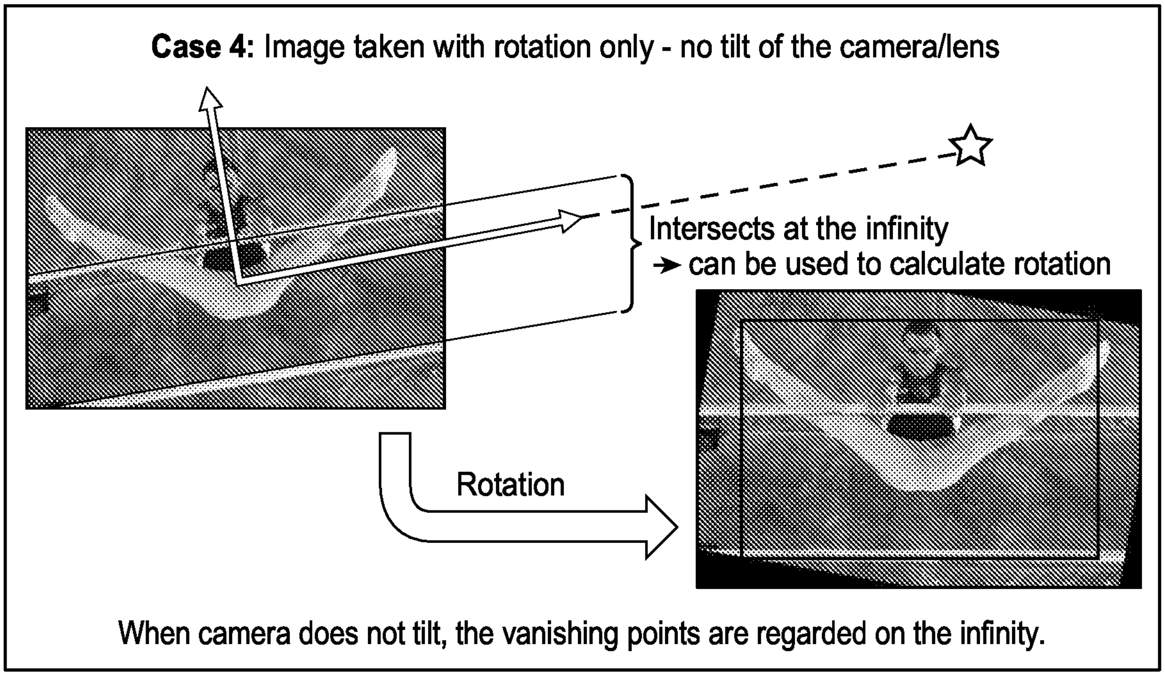
FIG. 8 shows an example of an image taken with rotation only.

FIG. 8 shows an example of an image that is distorted due to rotation only, with no tilt. In this case of rotation only, the vanishing points are located at infinity.

Figure 9:
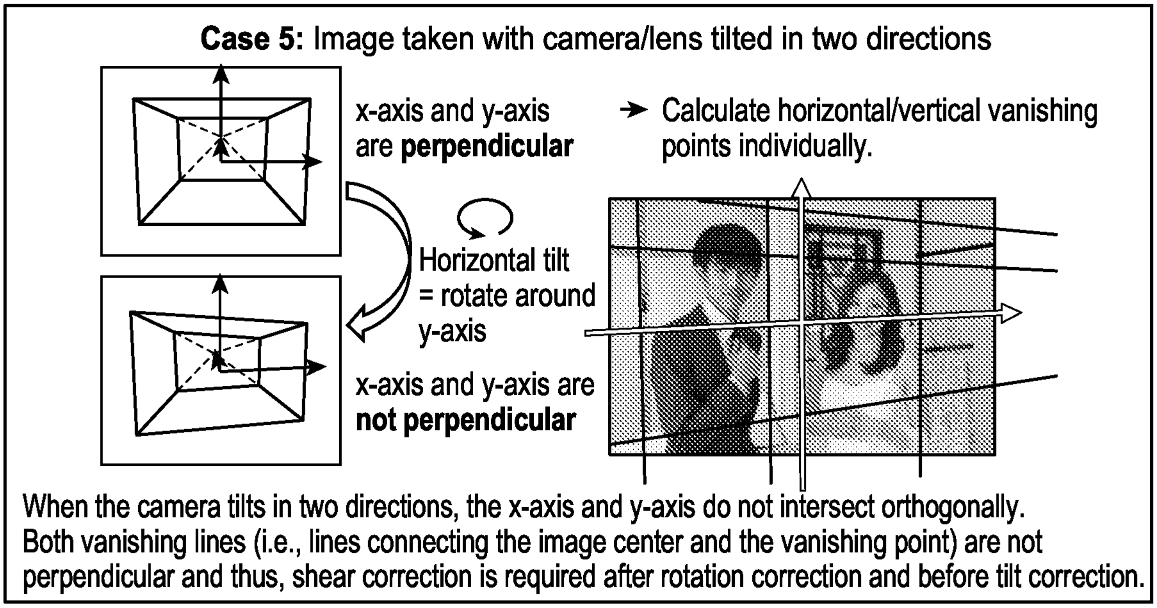
FIG. 9 shows an example of an image taken with tilt in two directions.

FIG. 9 shows an example of an image taken with the camera and/or lens tilted in two directions and the resulting distortion due to the tilts. In this case, the horizontal and vertical vanishing points are calculated individually. Note also that both vanishing point lines (i.e., lines connecting the image center and the vanishing point) are not perpendicular and thus, shear correction is required after rotation correction and before tilt correction.

Figure 10A:
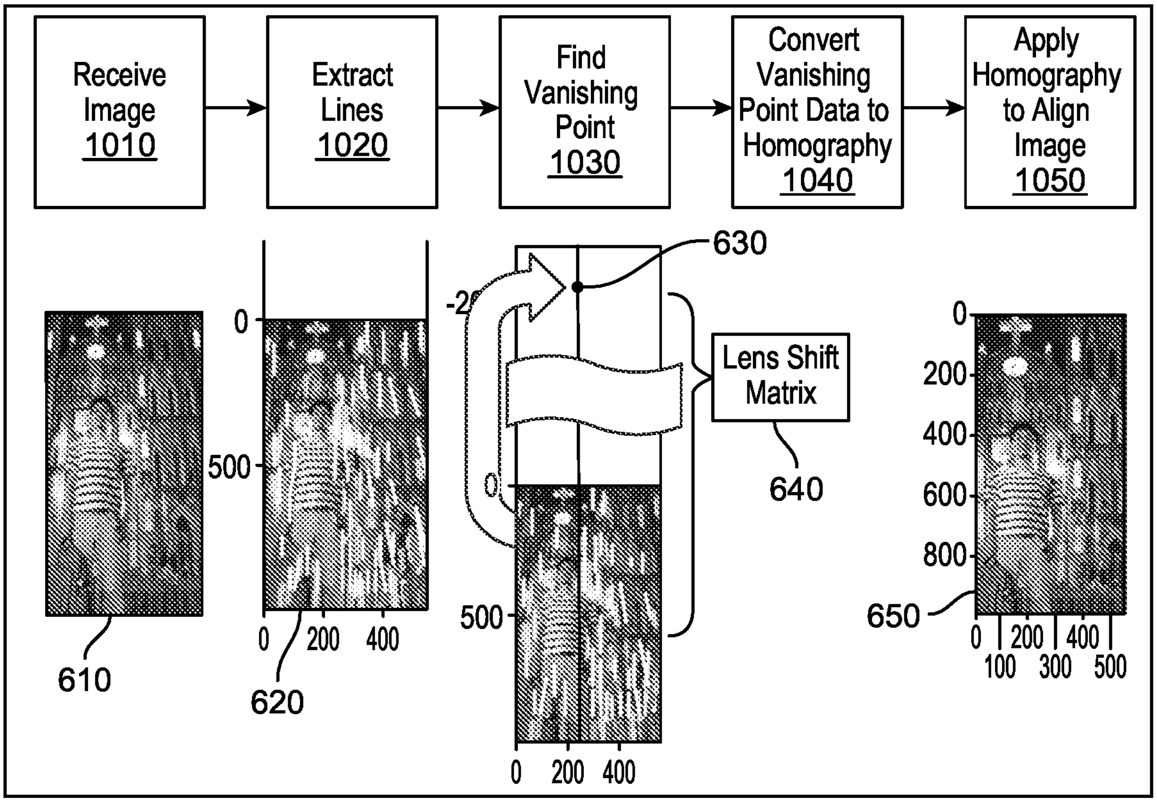
FIG. 10A shows a process flow for an exemplary method with respect to the example of FIG. 6.
Figure 10B:
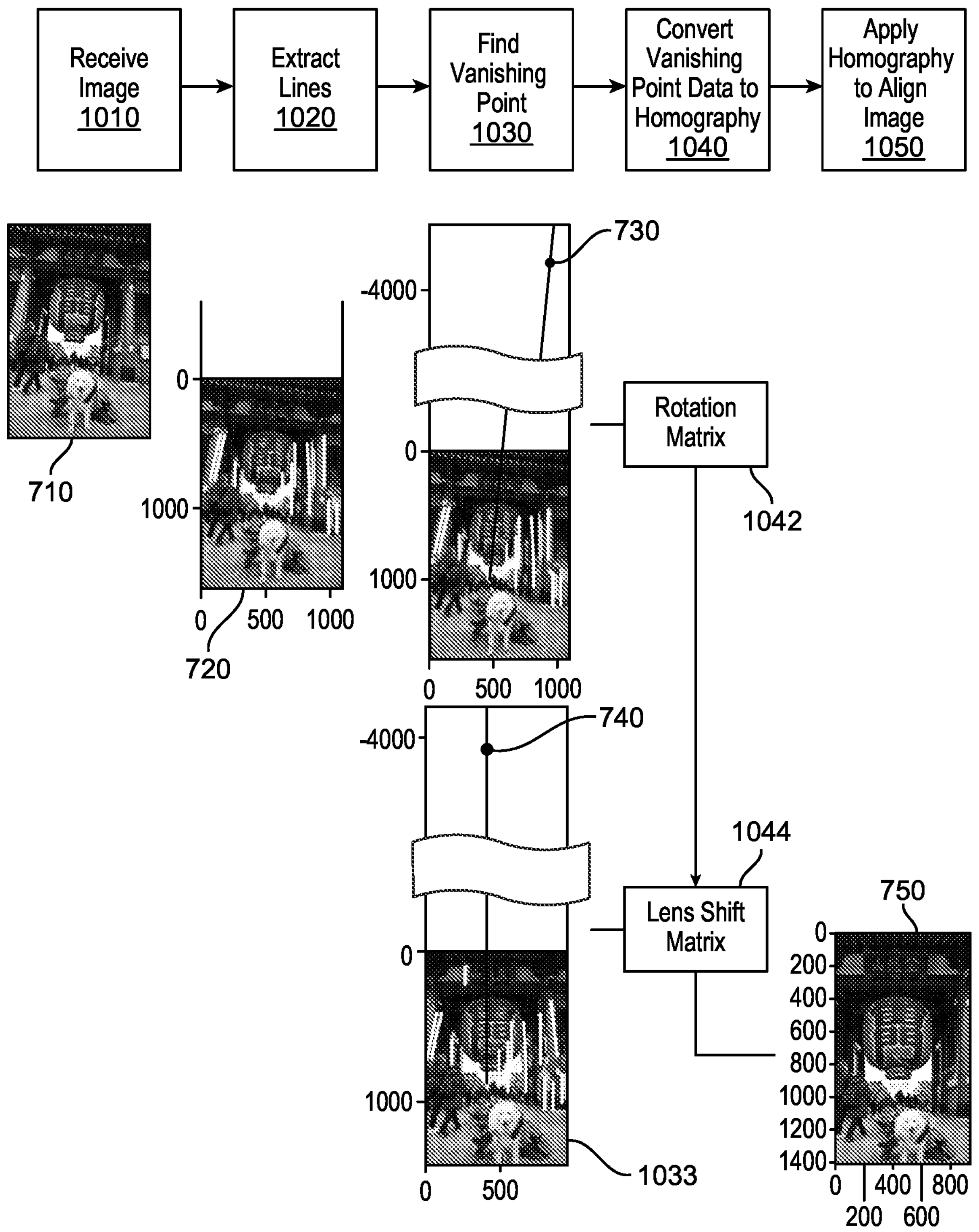
FIG. 10B shows a process flow for an exemplary method with respect to the example of FIG. 7.

FIGS. 10A-10B illustrate a process flow according to some embodiments of methods to align an image as described herein. As shown in FIG. 10A, a method for aligning an image comprises receiving an image at 1010, extracting lines from the image at 1020, finding a vanishing point based on the extracted lines at 1030 to generate vanishing point data, converting the vanishing point data to a homography at 1040, and applying the homography to align the image at 1050. FIG. 10A depicts how these steps are applied to case 2 as depicted in FIG. 6.

A system for aligning an image is disclosed that can be used to perform the method of FIG. 10A as described herein. In some embodiments, the system comprises one or more processors and a memory coupled to the one or more processors. In some embodiments, the one or more processors are configured to implement the operations of the method of FIG. 10A. Specifically, the memory is configured to provide the one or more processors with instructions that when executed cause the one or more processors to implement operations including receiving an image, extracting lines from the image, finding a vanishing point based on the extracted lines to generate vanishing point data, converting the vanishing point data to a homography, and applying the homography to align the image. In some cases, the memory is configured to provide the one or more processors with instructions corresponding to the operations of the method of FIG. 10A. In some cases, the instructions are embodied in a tangible computer readable storage medium.

A computer program product for aligning an image is disclosed, the computer program product being embodied in a tangible computer readable storage medium and including instructions for receiving an image, extracting lines from the image, finding a vanishing point based on the extracted lines to generate vanishing point data, converting the vanishing point data to a homography, and applying the homography to align the image.

Returning to the example in FIG. 10A applied to case 2 in FIG. 6, a system for aligning an image receives an image (e.g., image 610) by executing step 1010 and extracts lines from the image by executing step 1020. The extracted lines are shown on image 620. The system finds a vanishing point, shown at 630, by executing step 1030. The system converts vanishing point data associated with the vanishing point to a homography, which in this case is lens shift matrix 640, by executing step 1040. Finally, the system applies the homography, lens shift matrix 640, to image 610, resulting in a corrected and/or aligned image 650.

In a similar manner, FIG. 10B depicts how the steps described in FIG. 10A are applied to case 3 as depicted in FIG. 7. In the case of FIG. 10B, a system for aligning an image receives an image (e.g., image 710) by executing step 1010 and extracts lines from the image by executing step 1020. Here, the extracted lines are shown on the image 720. The system finds a vanishing point, shown at 730 and 740, by executing step 1030. The system converts vanishing point data associated with the vanishing point to a homography, which in this case is rotation matrix 1042 and lens shift matrix 1044, by executing step 1040. Finally, the system applies the homography, rotation matrix 1042, and lens shift matrix 1044, to image 710, resulting in a corrected and/or aligned image 750. Note that in this example, the rotation matrix 1042 may be applied to image 710 first, to correct distortion resulting from rotation, and then the lens shift matrix may be applied subsequently to correct distortion resulting from tilt (vertical lens shift). Alternatively, a homography obtained by taking the matrix product of the individual rotation and lens shift matrices respectively can be applied to the original image 710 to obtain the corrected and/or aligned image 750.

Example 2: Vanishing Point Analysis—Identifying a Vanishing Point

An important step in the methods and processes of the techniques described herein is to find and/or identify a vanishing point based on a plurality of extracted lines from a received image exhibiting some distortion, the distortion being manifested in the extracted lines. FIGS. 11A-11D describe various aspects of a process to find and/or identify a vanishing point from a plurality of extracted lines.

Figure 11A:
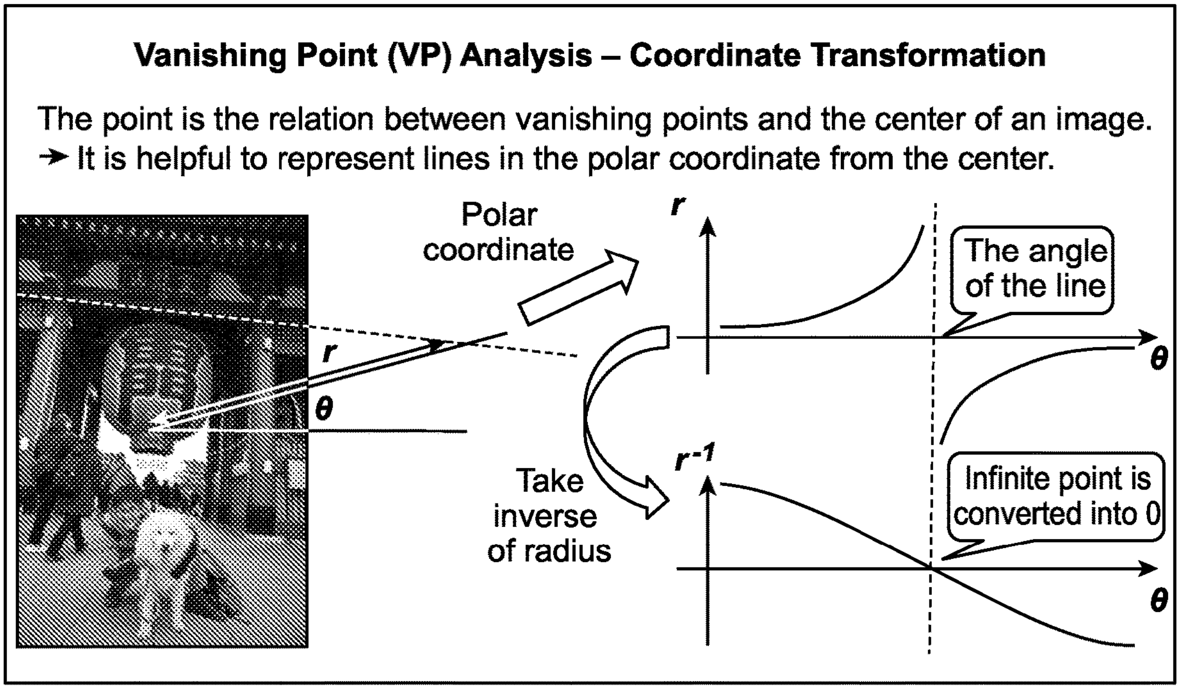
FIG. 11A shows a step in performing vanishing point analysis.

In some embodiments and as shown in FIG. 11A, in order to find and/or identify the vanishing point, the extracted lines are transformed into modified polar coordinates (r, θ) and the vanishing point is identified based on the modified polar coordinates. In particular, as shown in FIG. 11A, the modified polar coordinates include polar angles θ and inverse radii, each of which is associated with each of the extracted lines respectively.

In some embodiments, a threshold is chosen to define a range of angles for which lines are to be considered nearly-horizontal and/or horizontal-like, and/or nearly-vertical and/or vertical-like. A line extraction process can be used to select lines that meet the criteria set by the threshold, for example, each nearly-horizontal line deviating from perfectly horizontal by at most a first angle and/or each nearly-vertical line deviating from perfectly vertical by at most a second angle.

Figure 11B:
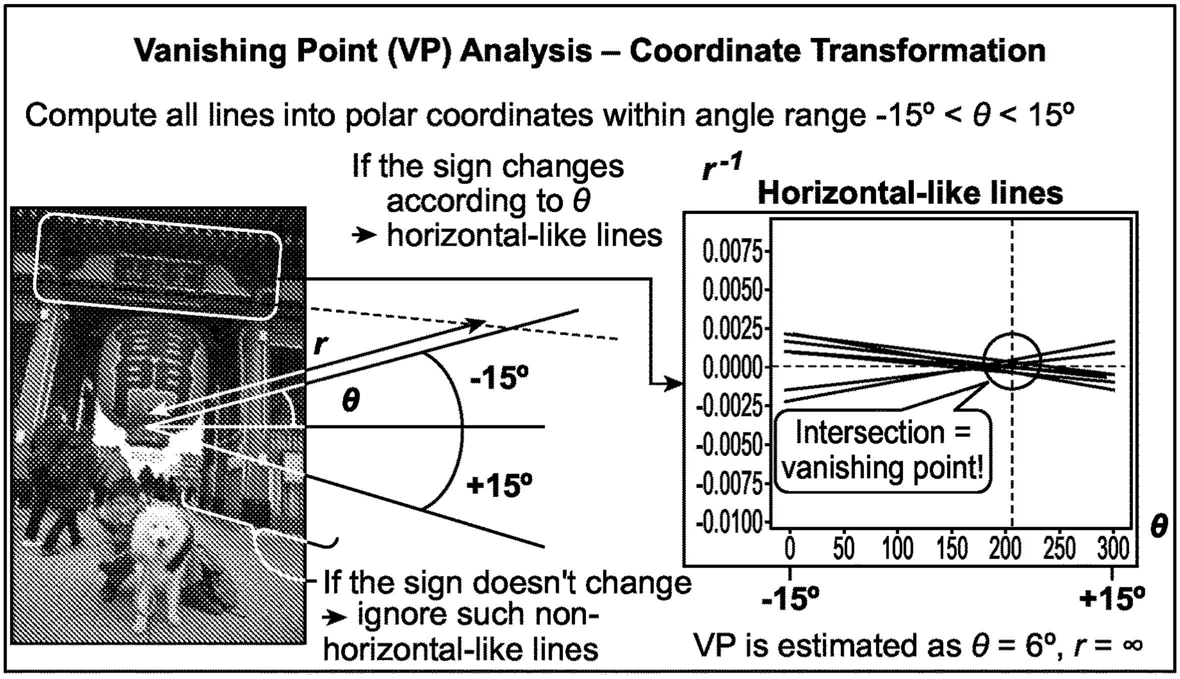
FIG. 11B shows how to identify a horizontal vanishing point from nearly horizontal and/or horizontal-like lines.

FIG. 11B shows an example of using a threshold of 15 degrees to define which lines are nearly-horizontal and/or horizontal-like for the line extraction process. In particular, as shown in FIG. 11B, horizontal-like lines are extracted and/or selected that deviate from perfectly horizontal by at most 15 degrees, that is, within an angle range of $-15°<\theta<15°$. The extracted lines are transformed and/or represented in polar coordinates and plotted on a graphical display showing the inverse radii, $r^{-1}$, plotted as a function of the polar angle, θ. As shown in the graphical display of FIG. 11B, the intersection point of the lines plotted in polar coordinates is determined to be the horizontal vanishing point associated with the nearly-horizontal and/or horizontal-like lines. In this case, the horizontal vanishing point is estimated as $\theta=6°$, $r=\infty$ based on the intersection of the lines on the $(\theta, r^{-1})$ plot.

Figure 11C:
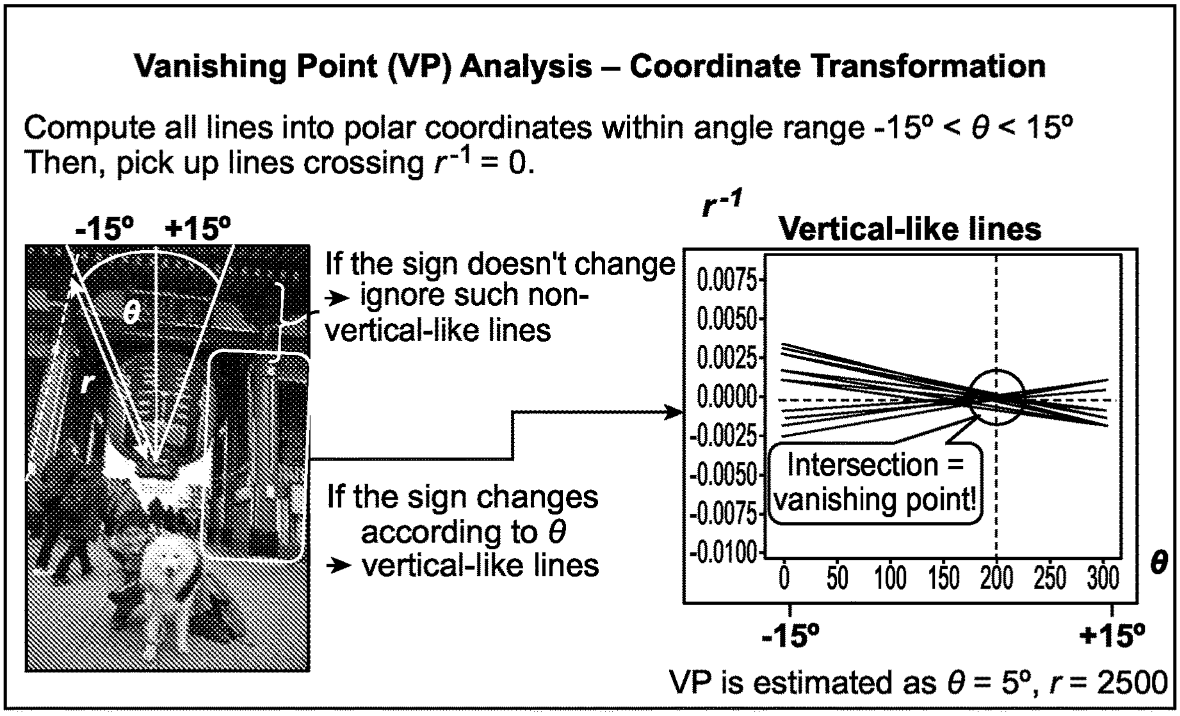
FIG. 11C shows how to identify a vertical vanishing point from nearly vertical and/or vertical-like lines.
Figure 11D:
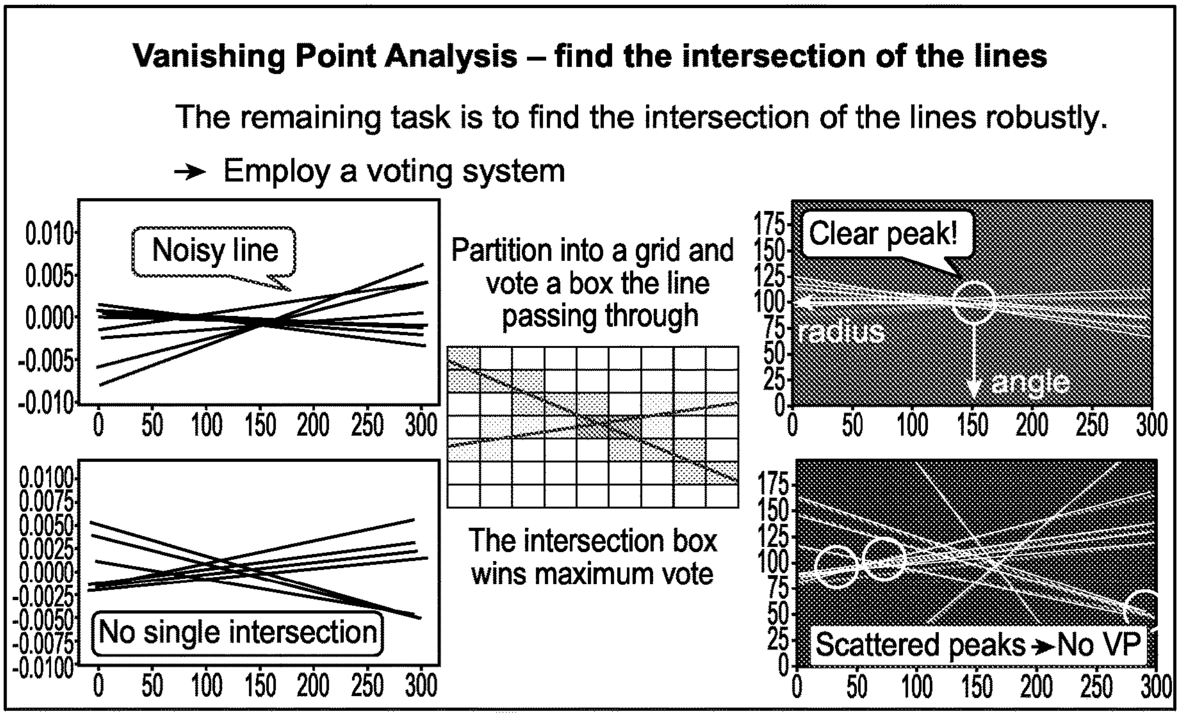
FIG. 11D shows the use of a voting system to determine an intersection.

In a similar manner, FIG. 11C shows the analysis performed for a plurality of nearly-vertical and/or vertical-like lines using a threshold of 15 degrees. As shown in FIG. 11C, vertical-like lines are extracted and/or selected that deviate from perfectly vertical by at most 15 degrees, that is, within an angle range of $-15°<\theta<15°$. The extracted lines are transformed and/or represented in polar coordinates and plotted on a graphical display showing the inverse radii, $r^{-1}$, plotted as a function of the polar angle, θ. As shown in the graphical display of FIG. 11C, the intersection point of the lines is determined to be the vertical vanishing point associated with the nearly-vertical and/or vertical-like lines. The vertical vanishing point is estimated as $\theta=5°$, $r=2500$, based on the intersection of the lines on the $(\theta, r^{-1})$ plot. As described above with respect to the examples shown in FIGS. 11B and 11C, the key to identifying the vanishing point in this analysis is to determine the point of intersection of the lines on the $(\theta, r^{-1})$ plot. However, in some cases, there may not be a clear single intersection point wherein all of the lines intersect each other. In such cases where there is no single intersection, a voting system is used to determine the intersection point of the lines and hence the vanishing point.

FIG. 11C shows how a voting system is used to find the intersection of the lines on the $(\theta, r^{-1})$ plot in order to identify the vanishing point. As shown in FIG. 11C, the $(\theta, r^{-1})$ plot is partitioned into a grid and a vote is counted for each box of the grid through which a line passes. The box with the largest number of votes (i.e., the largest number of lines passing through it) is selected as the intersection point. The process can then proceed to the next step of converting the vanishing point data obtained from the identified vanishing point to a homography in order to align the image.

Example 3: Identifying a Homography Based on the Vanishing Point

Figure 12:
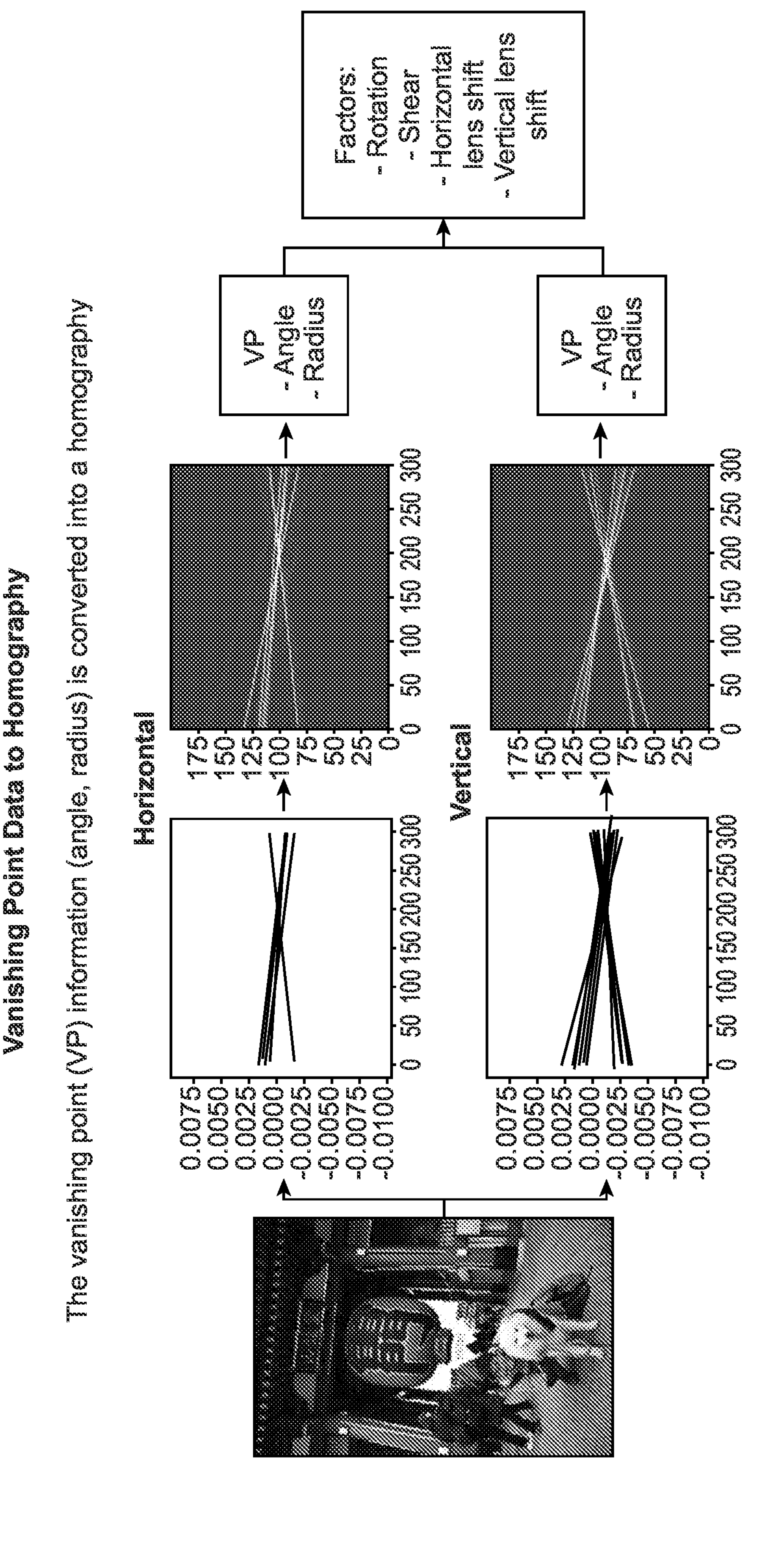
FIG. 12 shows a process of identifying a homography based on the vanishing point.

FIGS. 12-14 describe a process of identifying and/or determining a homography based on the vanishing point identified using techniques described in Example 2. As shown in FIG. 12, the vanishing point data (θ, r) (i.e., the polar angle and radius determined via the process described in Example 2) are converted into a homography to provide correction for each of the factors of rotation, shear, horizontal lens shift, and vertical lens shift respectively. These are shown as homography transformation matrices in FIG. 13 and FIG. 14 respectively. The horizontal vanishing point is given by its polar angle and horizontal radius $(\theta_h, r_h)$. Similarly, the vertical vanishing point is given by its polar angle and vertical radius $(\theta_v, r_v)$.

FIG. 13 shows how vanishing points are converted into homography transformation matrices for rotation and shear. FIG. 14 shows how vanishing points are converted into homography transformation matrices for horizontal and vertical lens shift. In FIGS. 13-14, w is the width of the original image, and h is the height of the original image.

Example 4: Using Camera Posture to Determine Vanishing Points and Homography

FIGS. 15-22 show a process for using camera posture to determine vanishing points and homography transformation matrices for aligning images exhibiting distortion resulting from rotation, shear, horizontal lens shift (tilt), and vertical lens shift (swing).

Figure 15:
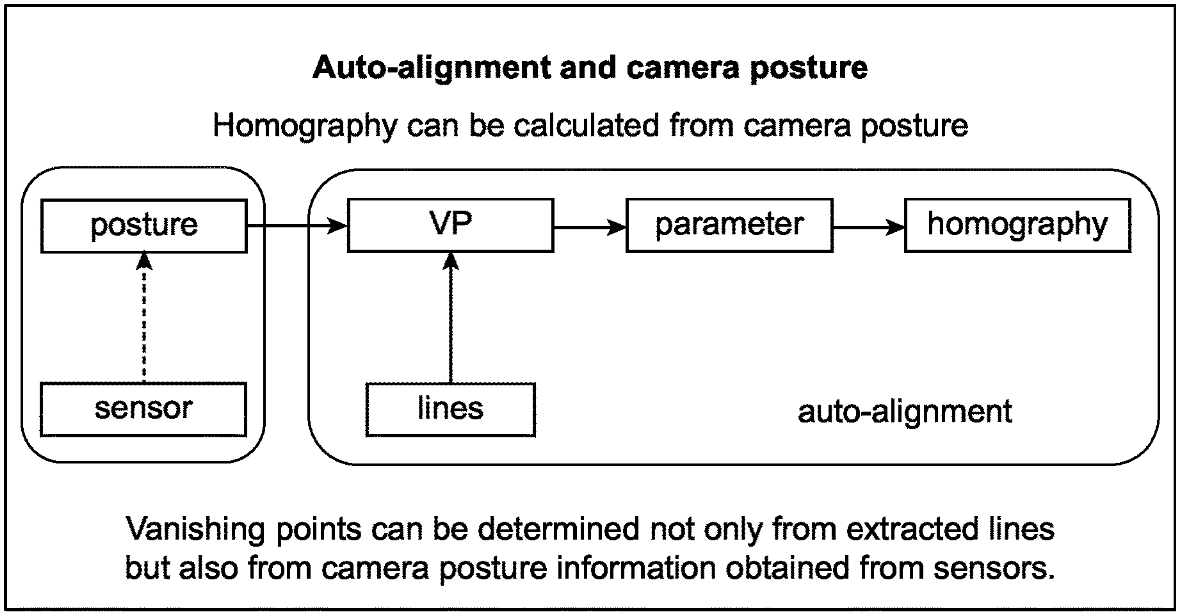
FIG. 15 describes an alternative approach to find and/or identify a homography.
Figure 16:
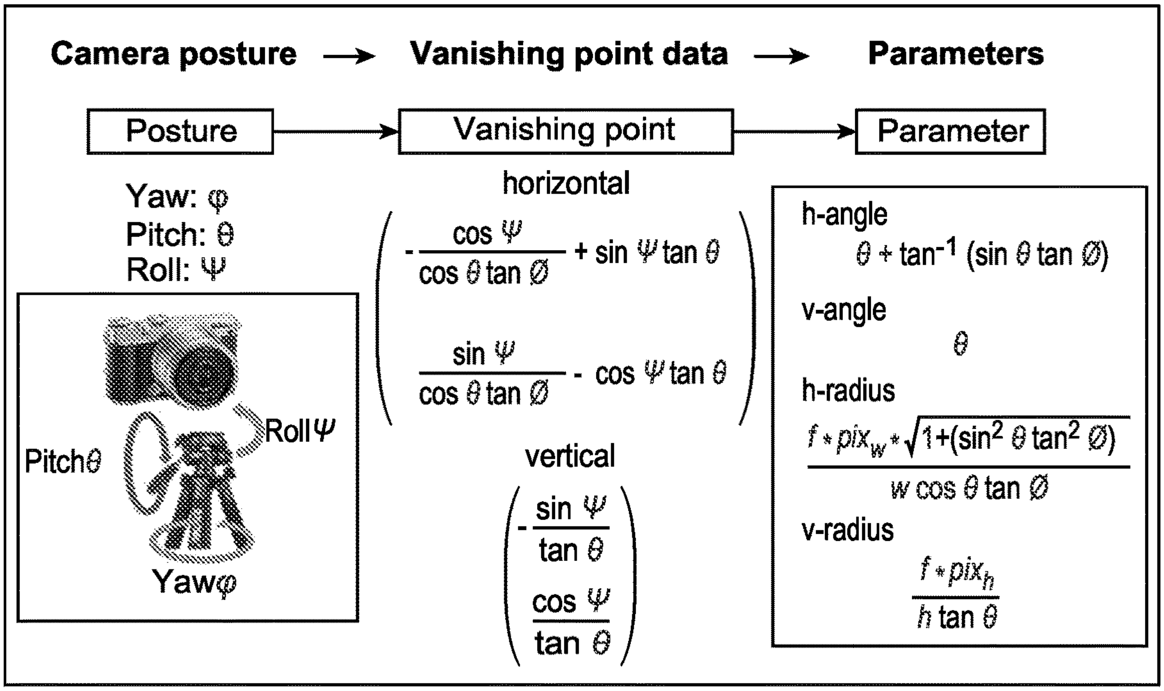
FIG. 16 shows a process for using camera posture to determine vanishing points and parameters for identifying a homography.

In some embodiments and as depicted in FIGS. 15-16, the vanishing point is identified and/or determined based on camera posture information obtained from sensors, which generates vanishing point data that is converted to parameters to find a homography. As shown in FIG. 16, camera posture information includes, for example, a yaw φ associated with the camera used to obtain the image, a pitch θ associated with the camera used to obtain the image, and a roll ψ associated with the camera used to obtain the image. Based on this camera posture information and as shown in FIG. 16, the horizontal vanishing point is given by:

$$\begin{pmatrix} -\frac{\cos\psi}{\cos\theta\tan\phi} + \sin\psi\tan\theta \\ \frac{\sin\psi}{\cos\theta\tan\phi} - \cos\psi\tan\theta \end{pmatrix}; \quad [1]$$

and the vertical vanishing point is given by:

$$\begin{pmatrix} -\frac{\sin\psi}{\tan\theta} \\ \frac{\cos\psi}{\tan\theta} \end{pmatrix}; \quad [2]$$

As shown in FIG. 16, parameters corresponding to the horizontal and vertical vanishing points include horizontal angle (h-angle) and radius (h-radius) and vertical angle (v-angle) and radius (v-radius) respectively.

V-angle is θ, and H-angle can be determined by using the following formula:

$$\theta+\tan^{-1}(\sin\theta\tan\phi); \quad [3]$$

H-radius is given by:

$$\frac{f*pix_w*\sqrt{1+\sin^2\theta\tan^2\phi}}{w\cos\theta\tan\phi}; \quad [4]$$

where f is the focal length and $pix_w$ is the number of horizontal pixels in the image sensor.

V-radius is given by:

$$\frac{f*pix_h}{h\tan\theta}; \quad [5]$$

where f is the focal length and $pix_h$ is the number of vertical pixels in the image sensor.

Using these parameters for the horizontal and vertical polar angles and radii values—namely, the vanishing point data (θ, r)—a homography can be determined as described in Example 3 using the homography transformation matrices shown in FIG. 13 and FIG. 14 respectively.

Figure 17:
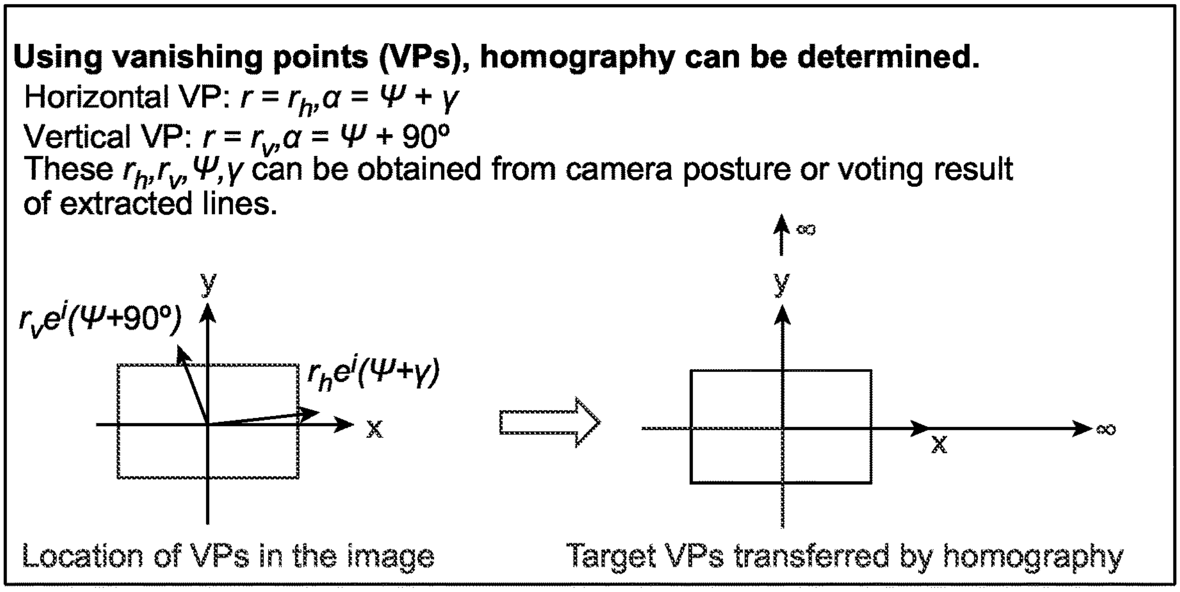
FIG. 17 shows a general approach for determining a homography using vanishing points based on camera posture and/or extracted lines as described herein.
Figure 18:
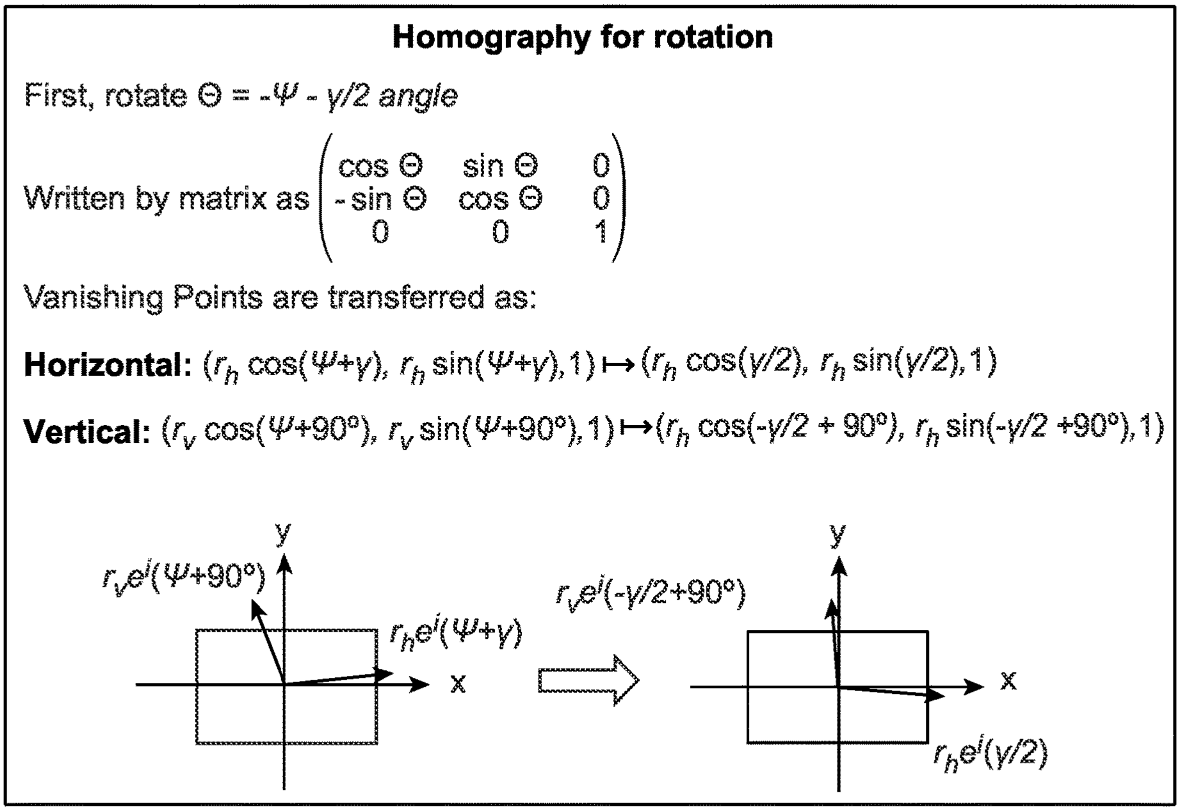
FIG. 18 shows a process to determine a homography to correct for rotation.
Figure 21:
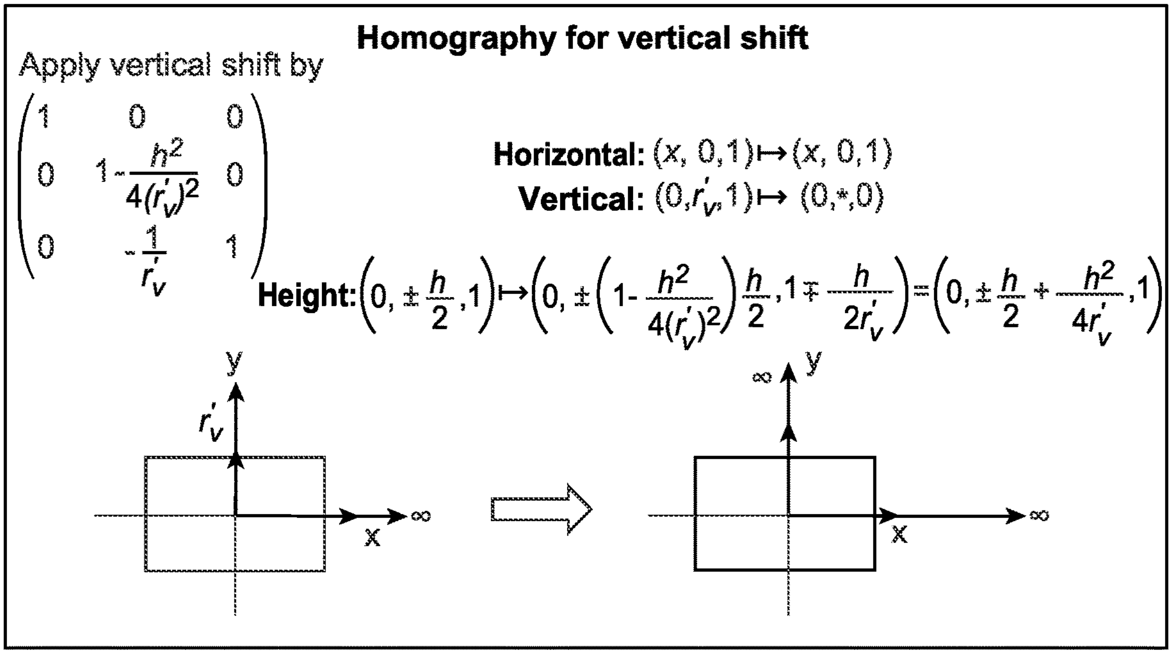
FIG. 21 shows a process to determine a homography to correct for vertical shift and/or swing.
Figure 22:
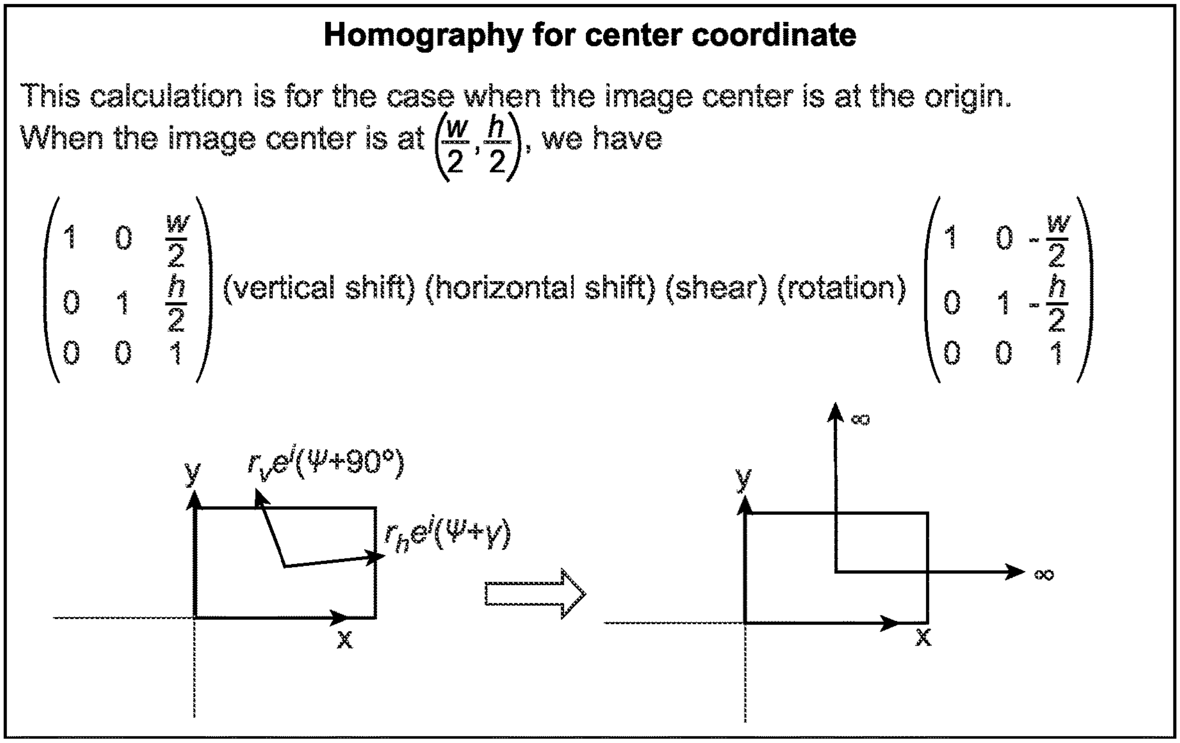
FIG. 22 shows a process to determine a homography for a center coordinate.

FIG. 17 shows how vanishing points and homography transformations can be determined from parameters based on camera posture and/or from extracted lines as described herein (e.g., using the voting system to determine vanishing points as in Example 2).

FIGS. 18-22 show how to determine a homography for rotation, shear, horizontal shift (tilt), vertical shift (swing), and the center coordinate (for the case where the image center is at the origin), with w being the width of the image, and h being the height of the image.

Figure 23:
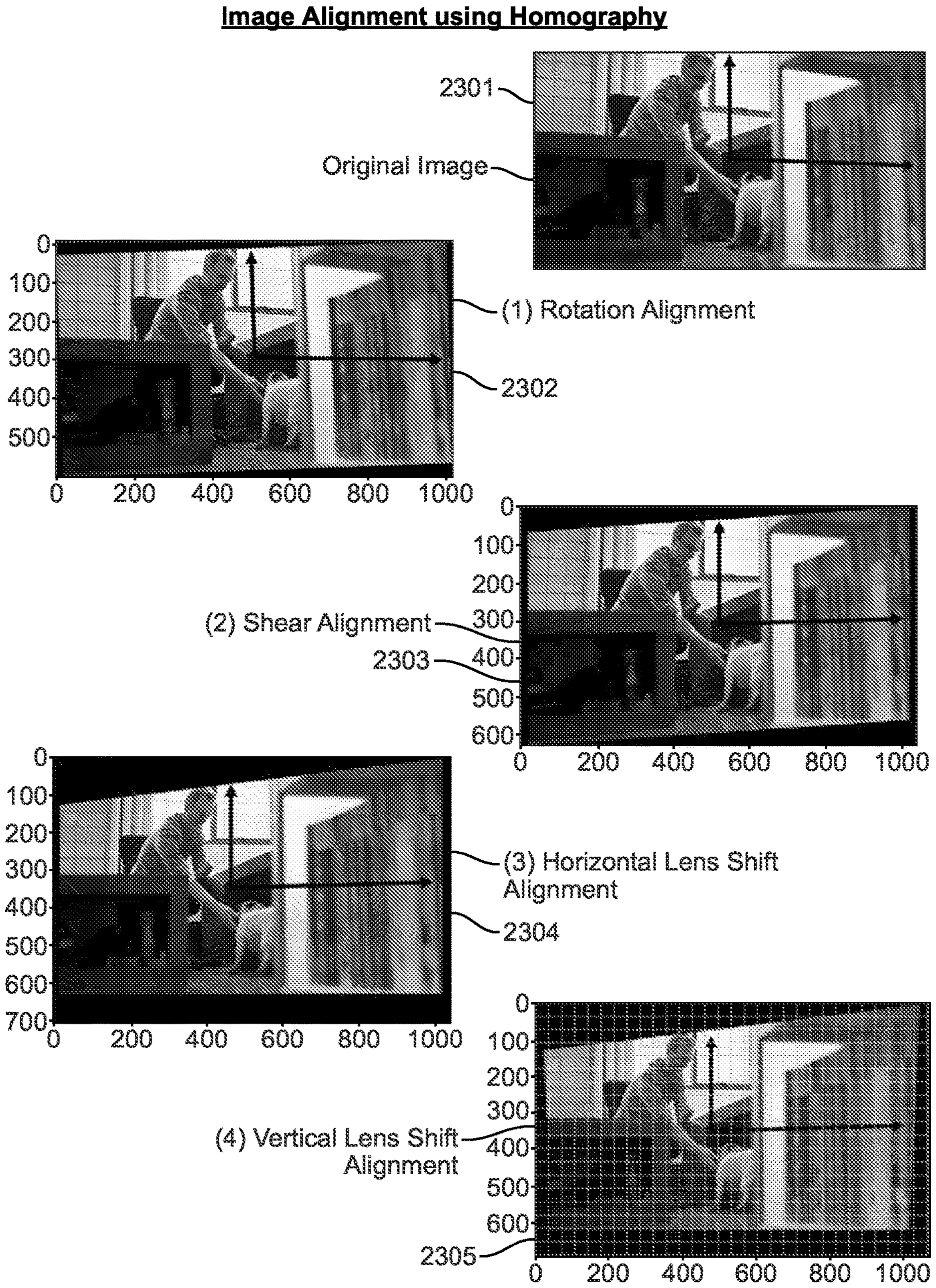
FIG. 23 shows an example of applying the disclosed techniques to align an image to correct for distortion.

FIG. 23 shows an example of applying the disclosed techniques to align an image to correct for distortion. The original image at 2301 is: (1) aligned to correct for rotation by applying a homography for rotation as described herein, with the resulting aligned image corrected for rotation shown at 2302: (2) aligned to correct for shear by applying a homography for shear as described herein, with the resulting aligned image corrected for shear shown at 2303: (3) aligned to correct for horizontal lens shift (tilt) by applying a homography for horizontal lens shift as described herein with the resulting aligned image corrected for horizontal lens shift shown at 2304 and: (4) aligned to correct for vertical lens shift (swing) by applying a homography for vertical lens shift as described herein with the resulting aligned image corrected for vertical lens shift shown at 2305.

Recitation of Embodiments

Embodiment 1. A system for aligning an image, comprising:

one or more processors; and a memory coupled with the one or more processors, wherein the memory is configured to provide the one or more processors with instructions that when executed cause the one or more processors to implement operations comprising:

(a) receiving an image;

(b) identifying a first vanishing point based on a plurality of nearly-horizontal lines in the image and a second vanishing point based on a plurality of nearly-vertical lines in the image, each nearly-horizontal line deviating from perfectly horizontal by at most a first angle, each nearly-vertical line deviating from perfectly vertical by at most a second angle;

(c) identifying a homography based on the first vanishing point and the second vanishing point; and (d) transforming the image according to the homography to thereby create an aligned image wherein:

the plurality of nearly-horizontal lines is thereby transformed to a plurality of substantially horizontal lines, each substantially horizontal line deviating from perfectly horizontal by at most a third angle; and the plurality of nearly-vertical lines is thereby transformed to a plurality of substantially vertical lines, each substantially vertical line deviating from perfectly vertical by at most a fourth angle.

Embodiment 2. The system of Embodiment 1, wherein the first angle and/or the second angle is at most 15 degrees.

Embodiment 3. The system of Embodiment 1 or 2, wherein the third angle and/or the fourth angle is at most 5 degrees.

Embodiment 4. The system of any one of Embodiments 1-3, wherein the memory is configured to provide the one or more processors with instructions that when executed cause the one or more processors to implement operations further comprising identifying the plurality of nearly-horizontal lines in the image and the plurality of nearly-vertical lines in the image.

Embodiment 5. The system of Embodiment 4, wherein the memory is configured to provide the one or more processors with instructions that when executed cause the one or more processors to implement operations further comprising applying a line extraction procedure to identify the plurality of nearly-horizontal lines and the plurality of nearly-vertical lines.

Embodiment 6. The system of Embodiment 5, wherein the line extraction procedure comprises one or more members selected from the group consisting of: a Hough transform, a progressive Hough transform, a line segment detector (LSD) procedure, a real-time LSD procedure, a fast line detector (FLD) procedure, a Cannylines procedure, a dynamic programming procedure, and a PPGNet procedure.

Embodiment 7. The system of any one of Embodiments 1-6, wherein (b) comprises:

(i) transforming the plurality of nearly-horizontal lines into a first plurality of modified polar coordinates associated therewith;

(ii) identifying the first vanishing point based on the first plurality of modified polar coordinates;

(iii) transforming the plurality of nearly-vertical lines into a second plurality of modified polar coordinates associated therewith; and (iv) identifying the second vanishing point based on the second plurality of modified polar coordinates.

Embodiment 8. The system of Embodiment 7, wherein:

the first plurality of modified polar coordinates comprises a first plurality of polar angles associated with the plurality of nearly-horizontal lines and a first plurality of inverse radii associated with the plurality of nearly-horizontal lines; and the second plurality of modified polar coordinates comprises a second plurality of polar angles associated with the plurality of nearly-vertical lines and a second plurality of inverse radii associated with the plurality of nearly-vertical lines.

Embodiment 9. The system of Embodiment 7 or 8, wherein:

(ii) comprises identifying a first intersection point based on the first plurality of modified polar coordinates; and (iv) comprises identifying a second intersection point based on the second plurality of modified polar coordinates.

Embodiment 10. The system of Embodiment 9, wherein (b) further comprises determining the first and/or second intersection point based on a voting operation.

Embodiment 11. The system of any one of Embodiments 1-3, wherein (b) comprises identifying the first and/or second vanishing point based at least in part on one or more members selected from the group consisting of: a yaw associated with a camera used to obtain the image; a pitch associated with the camera used to obtain the image; and a roll associated with the camera used to obtain the image.

Embodiment 12. The system of any one of Embodiments 1-11, wherein (c) comprises at least one or more members selected from the group consisting of:

(i) identifying a rotation transformation based at least in part on the first vanishing point and the second vanishing point;

(ii) identifying a shear transformation based at least in part on the first vanishing point and the second vanishing point;

(iii) identifying a horizontal lens shift transformation based at least in part on the first vanishing point and the second vanishing point; and (iv) identifying a vertical lens shift transformation based at least in part on the first vanishing point and the second vanishing point.

Embodiment 13. The system of Embodiment 12, wherein the homography is a product of one or more members selected from the group consisting of: the rotation transformation, the shear transformation, the horizontal lens shift transformation, and the vertical lens shift transformation.

Embodiment 14. The system of Embodiment 12, wherein (d) comprises at least one or more members selected from the group consisting of:

(i) applying the rotation transformation to the image;

(ii) applying the shear transformation to the image;

(iii) applying the horizontal lens shift transformation to the image; and (iv) applying the vertical lens shift transformation to the image.

Embodiment 15. A method for aligning an image, comprising:

(a) receiving an image;

(b) identifying a first vanishing point based on a plurality of nearly-horizontal lines in the image and a second vanishing point based on a plurality of nearly-vertical lines in the image, each nearly-horizontal line deviating from perfectly horizontal by at most a first angle, each nearly-vertical line deviating from perfectly vertical by at most a second angle;

(c) identifying a homography based on the first vanishing point and the second vanishing point; and (d) transforming the image according to the homography to thereby create an aligned image wherein:

the plurality of nearly-horizontal lines is thereby transformed to a plurality of substantially horizontal lines, each substantially horizontal line deviating from perfectly horizontal by at most a third angle; and the plurality of nearly-vertical lines is thereby transformed to a plurality of substantially vertical lines, each substantially vertical line deviating from perfectly vertical by at most a fourth angle.

Embodiment 16. The method of Embodiment 15, wherein the first angle and/or the second angle is at most 15 degrees.

Embodiment 17. The method of Embodiment 15 or 16, wherein the third angle and/or the fourth angle is at most 5 degrees.

Embodiment 18. The method of any one of Embodiments 15-17, further comprising identifying the plurality of nearly-horizontal lines in the image and the plurality of nearly-vertical lines in the image.

Embodiment 19. The method of Embodiment 18, further comprising applying a line extraction procedure to identify the plurality of nearly-horizontal lines and the plurality of nearly-vertical lines.

Embodiment 20. The method of Embodiment 19, wherein the line extraction procedure comprises one or more members selected from the group consisting of: a Hough transform, a progressive Hough transform, a line segment detector (LSD) procedure, a real-time LSD procedure, a fast line detector (FLD) procedure, a Cannylines procedure, a dynamic programming procedure, and a PPGNet procedure.

Embodiment 21. The method of any one of Embodiments 15-20, wherein (b) comprises:

(i) transforming the plurality of nearly-horizontal lines into a first plurality of modified polar coordinates associated therewith;

(ii) identifying the first vanishing point based on the first plurality of modified polar coordinates;

(iii) transforming the plurality of nearly-vertical lines into a second plurality of modified polar coordinates associated therewith; and (iv) identifying the second vanishing point based on the second plurality of modified polar coordinates.

Embodiment 22. The method of Embodiment 21, wherein:

the first plurality of modified polar coordinates comprises a first plurality of polar angles associated with the plurality of nearly-horizontal lines and a first plurality of inverse radii associated with the plurality of nearly-horizontal lines; and the second plurality of modified polar coordinates comprises a second plurality of polar angles associated with the plurality of nearly-vertical lines and a second plurality of inverse radii associated with the plurality of nearly-vertical lines.

Embodiment 23. The method of Embodiment 21 or 22, wherein:

(ii) comprises identifying a first intersection point based on the first plurality of modified polar coordinates; and (iv) comprises identifying a second intersection point based on the second plurality of modified polar coordinates.

Embodiment 24. The method of Embodiment 23, wherein (b) further comprises determining the first and/or second intersection point based on a voting operation.

Embodiment 25. The method of any one of Embodiments 15-17, wherein (b) comprises identifying the first and/or second vanishing point based at least in part on one or more members selected from the group consisting of: a yaw associated with a camera used to obtain the image: a pitch associated with the camera; and a roll associated with the camera.

Embodiment 26. The method of any one of Embodiments 15-25, wherein (c) comprises at least one or more members selected from the group consisting of:

(i) identifying a rotation transformation based at least in part on the first vanishing point and the second vanishing point;

(ii) identifying a shear transformation based at least in part on the first vanishing point and the second vanishing point;

(iii) identifying a horizontal lens shift transformation based at least in part on the first vanishing point and the second vanishing point; and (iv) identifying a vertical lens shift transformation based at least in part on the first vanishing point and the second vanishing point.

Embodiment 27. The method of Embodiment 26, wherein the homography is a product of one or more members selected from the group consisting of: the rotation transformation, the shear transformation, the horizontal lens shift transformation, and the vertical lens shift transformation.

Embodiment 28. The method of Embodiment 26, wherein (d) comprises at least one or more members selected from the group consisting of:

(i) applying the rotation transformation to the image;

(ii) applying the shear transformation to the image;

(iii) applying the horizontal lens shift transformation to the image; and (iv) applying the vertical lens shift transformation to the image.

Embodiment 29. A computer program product for aligning an image, the computer program product being embodied in a tangible computer readable storage medium and comprising computer instructions for:

(a) receiving an image;

(b) identifying a first vanishing point based on a plurality of nearly-horizontal lines in the image and a second vanishing point based on a plurality of nearly-vertical lines in the image, each nearly-horizontal line deviating from perfectly horizontal by at most a first angle, each nearly-vertical line deviating from perfectly vertical by at most a second angle;

(c) identifying a homography based on the first vanishing point and the second vanishing point; and (d) transforming the image according to the homography to thereby create an aligned image wherein:

the plurality of nearly-horizontal lines is thereby transformed to a plurality of substantially horizontal lines, each substantially horizontal line deviating from perfectly horizontal by at most a third angle; and the plurality of nearly-vertical lines is thereby transformed to a plurality of substantially vertical lines, each substantially vertical line deviating from perfectly vertical by at most a fourth angle.

Embodiment 30. The computer program product of Embodiment 29, wherein the first angle and/or the second angle is at most 15 degrees.

Embodiment 31. The computer program product of Embodiment 29 or 30, wherein the third angle and/or the fourth angle is at most 5 degrees.

Embodiment 32. The computer program product of any one of Embodiments 29-31, further comprising computer instructions for identifying the plurality of nearly-horizontal lines in the image and the plurality of nearly-vertical lines in the image.

Embodiment 33. The computer program product of Embodiment 32, further comprising computer instructions for applying a line extraction procedure to identify the plurality of nearly-horizontal lines and the plurality of nearly-vertical lines.

Embodiment 34. The computer program product of Embodiment 33, wherein the line extraction procedure comprises one or more members selected from the group consisting of: a Hough transform, a progressive Hough transform, a line segment detector (LSD) procedure, a real-time LSD procedure, a fast line detector (FLD) procedure, a Cannylines procedure, a dynamic programming procedure, and a PPGNet procedure.

Embodiment 35. The computer program product of any one of Embodiments 29-34, wherein (b) comprises:

(i) transforming the plurality of nearly-horizontal lines into a first plurality of modified polar coordinates associated therewith;

(ii) identifying the first vanishing point based on the first plurality of modified polar coordinates;

(iii) transforming the plurality of nearly-vertical lines into a second plurality of modified polar coordinates associated therewith; and (iv) identifying the second vanishing point based on the second plurality of modified polar coordinates.

Embodiment 36. The computer program product of Embodiment 35, wherein:

the first plurality of modified polar coordinates comprises a first plurality of polar angles associated with the plurality of nearly-horizontal lines and a first plurality of inverse radii associated with the plurality of nearly-horizontal lines; and the second plurality of modified polar coordinates comprises a second plurality of polar angles associated with the plurality of nearly-vertical lines and a second plurality of inverse radii associated with the plurality of nearly-vertical lines.

Embodiment 37. The computer program product of Embodiment 35 or 36, wherein:

(ii) comprises identifying a first intersection point based on the first plurality of modified polar coordinates; and (iv) comprises identifying a second intersection point based on the second plurality of modified polar coordinates.

Embodiment 38. The computer program product of Embodiment 37, wherein (b) further comprises determining the first and/or second intersection point based on a voting operation.

Embodiment 39. The computer program product of any one of Embodiments 29-31, wherein (b) comprises identifying the first and/or second vanishing point based at least in part on one or more members selected from the group consisting of: a yaw associated with a camera used to obtain the image; a pitch associated with the camera used to obtain the image; and a roll associated with the camera used to obtain the image.

Embodiment 40. The computer program product of any one of Embodiments 29-39, wherein (c) comprises at least one or more members selected from the group consisting of:

(i) identifying a rotation transformation based at least in part on the first vanishing point and the second vanishing point;

(ii) identifying a shear transformation based at least in part on the first vanishing point and the second vanishing point;

(iii) identifying a horizontal lens shift transformation based at least in part on the first vanishing point and the second vanishing point; and (iv) identifying a vertical lens shift transformation based at least in part on the first vanishing point and the second vanishing point.

Embodiment 41. The computer program product of Embodiment 40, wherein the homography is a product of one or more members selected from the group consisting of: the rotation transformation, the shear transformation, the horizontal lens shift transformation, and the vertical lens shift transformation.

Embodiment 42. The computer program product of Embodiment 40, wherein (d) comprises at least one or more members selected from the group consisting of:

(i) applying the rotation transformation to the image;

(ii) applying the shear transformation to the image;

(iii) applying the horizontal lens shift transformation to the image; and (iv) applying the vertical lens shift transformation to the image.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system for aligning an image, comprising:

one or more processors; and a memory coupled with the one or more processors, wherein the memory is configured to provide the one or more processors with instructions that when executed cause the one or more processors to implement operations comprising:

(a) receiving an image;

(b) identifying a first vanishing point based on a plurality of nearly-horizontal lines in the image and a second vanishing point based on a plurality of nearly-vertical lines in the image, each nearly-horizontal line deviating from perfectly horizontal by at most a first angle, each nearly-vertical line deviating from perfectly vertical by at most a second angle;

(c) identifying a homography based on the first vanishing point and the second vanishing point; and (d) transforming the image according to the homography to thereby create an aligned image wherein:

the plurality of nearly-horizontal lines is thereby transformed to a plurality of substantially horizontal lines, each substantially horizontal line deviating from perfectly horizontal by at most a third angle; and the plurality of nearly-vertical lines is thereby transformed to a plurality of substantially vertical lines, each substantially vertical line deviating from perfectly vertical by at most a fourth angle; and wherein (c) comprises at least one or more members selected from the group consisting of:

(i) identifying a rotation transformation based at least in part on the first vanishing point and the second vanishing point;

(ii) identifying a shear transformation based at least in part on the first vanishing point and the second vanishing point;

(iii) identifying a horizontal lens shift transformation based at least in part on the first vanishing point and the second vanishing point; and (iv) identifying a vertical lens shift transformation based at least in part on the first vanishing point and the second vanishing point.

2. The system of claim 1, wherein the first angle and/or the second angle is at most 15 degrees.

3. The system of claim 1, wherein the third angle and/or the fourth angle is at most 5 degrees.

4. The system of claim 1, wherein the memory is configured to provide the one or more processors with instructions that when executed cause the one or more processors to implement operations further comprising identifying the plurality of nearly-horizontal lines in the image and the plurality of nearly-vertical lines in the image.

5. The system of claim 4, wherein the memory is configured to provide the one or more processors with instructions that when executed cause the one or more processors to implement operations further comprising applying a line extraction procedure to identify the plurality of nearly-horizontal lines and the plurality of nearly-vertical lines.

6. The system of claim 5, wherein the line extraction procedure comprises one or more members selected from the group consisting of: a Hough transform, a progressive Hough transform, a line segment detector (LSD) procedure, a real-time LSD procedure, a fast line detector (FLD) procedure, a Cannylines procedure, a dynamic programming procedure, and a PPGNet procedure.

7. The system of claim 1, wherein (b) comprises:

(i) transforming the plurality of nearly-horizontal lines into a first plurality of modified polar coordinates associated therewith;

(ii) identifying the first vanishing point based on the first plurality of modified polar coordinates;

(iii) transforming the plurality of nearly-vertical lines into a second plurality of modified polar coordinates associated therewith; and (iv) identifying the second vanishing point based on the second plurality of modified polar coordinates.

8. The system of claim 7, wherein:

the first plurality of modified polar coordinates comprises a first plurality of polar angles associated with the plurality of nearly-horizontal lines and a first plurality of inverse radii associated with the plurality of nearly-horizontal lines; and the second plurality of modified polar coordinates comprises a second plurality of polar angles associated with the plurality of nearly-vertical lines and a second plurality of inverse radii associated with the plurality of nearly-vertical lines.

9. The system of claim 7, wherein:

(ii) comprises identifying a first intersection point based on the first plurality of modified polar coordinates; and (iv) comprises identifying a second intersection point based on the second plurality of modified polar coordinates.

10. The system of claim 9, wherein (b) further comprises determining the first and/or second intersection point based on a voting operation.

11. The system of claim 7, wherein the homography is a product of one or more members selected from the group consisting of: the rotation transformation, the shear transformation, the horizontal lens shift transformation, and the vertical lens shift transformation.

12. The system of claim 7, wherein (d) comprises at least one or more members selected from the group consisting of:

(i) applying the rotation transformation to the image;
(ii) applying the shear transformation to the image;
(iii) applying the horizontal lens shift transformation to the image; and
(iv) applying the vertical lens shift transformation to the image.

13. The system of claim 1, wherein (b) comprises identifying the first and/or second vanishing point based at least in part on one or more members selected from the group consisting of: a yaw associated with a camera used to obtain the image; a pitch associated with the camera used to obtain the image; and a roll associated with the camera used to obtain the image.

14. The system of claim 13, wherein the homography is a product of one or more members selected from the group consisting of: the rotation transformation, the shear transformation, the horizontal lens shift transformation, and the vertical lens shift transformation.

15. The system of claim 13, wherein (d) comprises at least one or more members selected from the group consisting of:
(i) applying the rotation transformation to the image;
(ii) applying the shear transformation to the image;
(iii) applying the horizontal lens shift transformation to the image; and
(iv) applying the vertical lens shift transformation to the image.

16. The system of claim 1, wherein the homography is a product of one or more members selected from the group consisting of: the rotation transformation, the shear transformation, the horizontal lens shift transformation, and the vertical lens shift transformation.

17. The system of claim 1, wherein (d) comprises at least one or more members selected from the group consisting of:
(i) applying the rotation transformation to the image;
(ii) applying the shear transformation to the image;
(iii) applying the horizontal lens shift transformation to the image; and
(iv) applying the vertical lens shift transformation to the image.

18. A system for aligning an image, comprising:
one or more processors; and
a memory coupled with the one or more processors, wherein the memory is configured to provide the one or more processors with instructions that when executed cause the one or more processors to implement operations comprising:
(a) receiving an image;
(b) identifying a first vanishing point based on a plurality of nearly-horizontal lines in the image and a second vanishing point based on a plurality of nearly-vertical lines in the image, each nearly-horizontal line deviating from perfectly horizontal by at most a first angle, each nearly-vertical line deviating from perfectly vertical by at most a second angle;
(c) identifying a homography based on the first vanishing point and the second vanishing point; and
(d) transforming the image according to the homography to thereby create an aligned image wherein:
the plurality of nearly-horizontal lines is thereby transformed to a plurality of substantially horizontal lines, each substantially horizontal line deviating from perfectly horizontal by at most a third angle; and
the plurality of nearly-vertical lines is thereby transformed to a plurality of substantially vertical lines, each substantially vertical line deviating from perfectly vertical by at most a fourth angle; and
wherein (b) comprises:
(i) transforming the plurality of nearly-horizontal lines into a first plurality of modified polar coordinates associated therewith;
(ii) identifying the first vanishing point based on the first plurality of modified polar coordinates;
(iii) transforming the plurality of nearly-vertical lines into a second plurality of modified polar coordinates associated therewith; and
(iv) identifying the second vanishing point based on the second plurality of modified polar coordinates; and
wherein the first plurality of modified polar coordinates comprises a first plurality of polar angles associated with the plurality of nearly-horizontal lines and a first plurality of inverse radii associated with the plurality of nearly-horizontal lines; and
the second plurality of modified polar coordinates comprises a second plurality of polar angles associated with the plurality of nearly-vertical lines and a second plurality of inverse radii associated with the plurality of nearly-vertical lines.

19. The system of claim 18, wherein:
(ii) comprises identifying a first intersection point based on the first plurality of modified polar coordinates; and
(iv) comprises identifying a second intersection point based on the second plurality of modified polar coordinates.

20. A system for aligning an image, comprising:
one or more processors; and
a memory coupled with the one or more processors, wherein the memory is configured to provide the one or more processors with instructions that when executed cause the one or more processors to implement operations comprising:
(a) receiving an image;
(b) identifying a first vanishing point based on a plurality of nearly-horizontal lines in the image and a second vanishing point based on a plurality of nearly-vertical lines in the image, each nearly-horizontal line deviating from perfectly horizontal by at most a first angle, each nearly-vertical line deviating from perfectly vertical by at most a second angle;
(c) identifying a homography based on the first vanishing point and the second vanishing point; and
(d) transforming the image according to the homography to thereby create an aligned image wherein:
the plurality of nearly-horizontal lines is thereby transformed to a plurality of substantially horizontal lines, each substantially horizontal line deviating from perfectly horizontal by at most a third angle; and
the plurality of nearly-vertical lines is thereby transformed to a plurality of substantially vertical lines, each substantially vertical line deviating from perfectly vertical by at most a fourth angle; and wherein (b) comprises:
(i) transforming the plurality of nearly-horizontal lines into a first plurality of modified polar coordinates associated therewith;
(ii) identifying the first vanishing point based on the first plurality of modified polar coordinates;
(iii) transforming the plurality of nearly-vertical lines into a second plurality of modified polar coordinates associated therewith; and
(iv) identifying the second vanishing point based on the second plurality of modified polar coordinates; and wherein:
(ii) comprises identifying a first intersection point based on the first plurality of modified polar coordinates; and (iv) comprises identifying a second intersection point based on the second plurality of modified polar coordinates.

* * * * *